(12) United States Patent
Chen et al.

(10) Patent No.: US 10,694,204 B2
(45) Date of Patent: Jun. 23, 2020

(54) SYSTEMS AND METHODS FOR MOTION COMPENSATED RESIDUAL PREDICTION

(71) Applicant: Vid Scale, Inc., Wilmington, DE (US)

(72) Inventors: Chun-Chi Chen, Hsinchu (TW); Xiaoyu Xiu, San Diego, CA (US); Yuwen He, San Diego, CA (US); Yan Ye, San Diego, CA (US)

(73) Assignee: Vid Scale, Inc., Wilmington, DE (US)

( * ) Notice: Subject to any disclaimer, the term of this patent is extended or adjusted under 35 U.S.C. 154(b) by 0 days.

(21) Appl. No.: 16/096,232

(22) PCT Filed: May 2, 2017

(86) PCT No.: PCT/US2017/030681
§ 371 (c)(1),
(2) Date: Oct. 24, 2018

(87) PCT Pub. No.: WO2017/192616
PCT Pub. Date: Nov. 9, 2017

(65) Prior Publication Data
US 2019/0166380 A1    May 30, 2019

Related U.S. Application Data

(60) Provisional application No. 62/332,929, filed on May 6, 2016.

(51) Int. Cl.
*H04N 19/503* (2014.01)
*H04N 19/176* (2014.01)
(Continued)

(52) U.S. Cl.
CPC ......... *H04N 19/503* (2014.11); *H04N 19/117* (2014.11); *H04N 19/136* (2014.11); *H04N 19/176* (2014.11)

(58) Field of Classification Search
CPC .. H04N 19/103; H04N 19/115; H04N 19/126; H04N 19/149; H04N 19/192; H04N 19/194
(Continued)

(56) References Cited

U.S. PATENT DOCUMENTS

2007/0009030 A1    1/2007    Song
2010/0329342 A1    12/2010   Joshi
(Continued)

FOREIGN PATENT DOCUMENTS

WO        2008111005        9/2008

OTHER PUBLICATIONS

International Search Report and the Written Opinion of the International Searching Authority, for PCT/US2017/030681 dated Jul. 19, 2017, 17 pages.
(Continued)

*Primary Examiner* — Dominic D Saltarelli
(74) *Attorney, Agent, or Firm* — Invention Mine LLC

(57) ABSTRACT

Systems and methods are disclosed for improving the prediction efficiency for residual prediction using motion compensated residual prediction (MCRP). Exemplary residual prediction techniques employ motion compensated prediction and processed residual reference pictures. Further disclosed herein are systems and methods for generating residual reference pictures. These pictures can be generated adaptively with or without considering in-loop filtering effects. Exemplary de-noising filter designs are also described for enhancing the quality of residual reference pictures, and compression methods are described for reducing the storage size of reference pictures. Further disclosed herein are exemplary syntax designs for communicating residuals' motion information.

20 Claims, 14 Drawing Sheets

(51) Int. Cl.
    *H04N 19/117*    (2014.01)
    *H04N 19/136*    (2014.01)
(58) Field of Classification Search
    USPC .................................... 375/240.02, 240.12
    See application file for complete search history.

(56)  References Cited

U.S. PATENT DOCUMENTS

| | | | |
|---|---|---|---|
| 2012/0033737 A1 | 2/2012 | Sato | |
| 2012/0243608 A1* | 9/2012 | Yu | H04N 19/176 |
| | | | 375/240.12 |
| 2014/0023139 A1* | 1/2014 | Xu | H04N 19/159 |
| | | | 375/240.12 |
| 2014/0072041 A1 | 3/2014 | Seregin | |
| 2014/0078250 A1 | 3/2014 | Zhang | |
| 2014/0198842 A1 | 7/2014 | He | |
| 2018/0309995 A1* | 10/2018 | He | H04N 19/126 |

OTHER PUBLICATIONS

Zhang, W. et al, "TE B3: Inter-Layer Residual Refinement". Joint Collaborative Team on Video Coding, JCTVC-L0286, Jan. 2013, 2 pages.

Schwarz, H., et al, "Overview of the Scalable Video Coding Extension of the H.264/AVC Standard". IEEE Transactions on Circuits and Systems for Video Technology., vol. 17, No. 9, Sep. 2007, pp. 1103-1120.

Yeh, C.H., et. al., "Second Order Residual Prediction for HEVC Inter Coding". Signal and Information Processing Association Annual Summit and Conference (APSIPA), (2014), 4 pages.

Written Opinion of the International Preliminary Examining Authority for PCT/US2017/030681 dated Apr. 4, 2018.

International Preliminary Report on Patentability for PCT/US2017/030681 completed on Jul. 17, 2018.

International Telecommunication Union, "Advanced Video Coding for Generic Audiovisual Services". In Series H: Audiovisual and Multimedia Systems; Infrastructure of audiovisual services; Coding of moving video. ITU-T Rec H.264 (Nov. 2007), 564 pages, Nov. 2007.

SMPTE 421M, "VC-1 Compressed Video Bitstream Format and Decoding Process". SMPTE Standard, (2006), 493 pages.

Bross, B., et. al., "High Efficiency Video Coding (HEVC) text specification draft 10 (for FDIS and Last Call)". Joint Collaborative Team on Video Coding (JCT-VC), Document No. JCTVC-L1003. Jan. 2013, 315 pages.

Tomasi, C., et. al., "Bilateral filtering for gray and color images". IEEE International Conference on Computer Vision, (1998), 8 pages.

Wikipedia "Exponential-Golomb Coding". Wikipedia article modified on Jan. 30, 2016, available at: https://en.wikipedia.org/w/index.php?title=Exponential-Golomb_coding&oldid=702406490, 2 pages.

Chen, S., et. al., "Second Order Prediction (SOP) in P Slice". ITU—Telecommunications Standardization Sector, Video Coding Experts Group (VCEG), VCEG-A127, Jul. 2008, pp. 1-7.

Li, Shangwen, et. al., "Second Order Prediction on H.264/AVC". Picture Coding Symposium, (2009), pp. 1-4.

Zhang, Qi, et. al., "Multi-Order-Residual (MOR) Video Coding: Framework, Analysis and Performance". Proceedings of SPIE 7744, Visual Communications and Image Processing, vol. 7744, Aug. 4, 2010, pp. 774411-1 to 774411-10.

* cited by examiner

SYSTEMS AND METHODS FOR MOTION COMPENSATED RESIDUAL PREDICTION

CROSS-REFERENCE TO RELATED APPLICATIONS

The present application is a national stage application under 35 U.S.C. 371 of International Application No. PCT/US2017/030681, entitled SYSTEMS AND METHODS FOR MOTION COMPENSATED RESIDUAL PREDICTION, filed on May 2, 2017, which claims benefit under 35 U.S.C. § 119(e) from U.S. Provisional Patent Application Ser. No. 62/332,929, filed May 6, 2016, entitled "SYSTEMS AND METHODS FOR MOTION COMPENSATED RESIDUAL PREDICTION," which is incorporated herein by reference in its entirety.

BACKGROUND

Video coding systems are widely used to compress digital video signals to reduce the storage requirements and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG. Improved systems and methods for coding video data to further reduce storage and bandwidth requirements would be desirable for consumers and providers of digital video systems.

SUMMARY

Systems and methods are disclosed for improving the prediction efficiency for residual prediction using motion compensated residual prediction (MCRP). The disclosed systems and methods are further extended to not only the residuals of inter coded blocks but also to the residuals of intra coded blocks. Exemplary residual prediction techniques employ motion compensated prediction and processed residual reference pictures. Further disclosed herein are systems and methods for generating residual reference pictures. These pictures can be generated adaptively with or without considering in-loop filtering effects. Exemplary de-noising filter designs are also described for enhancing the quality of residual reference pictures, and compression methods are described for reducing the storage size of reference pictures. Further disclosed herein are exemplary syntax designs for communicating residuals' motion information.

Exemplary approaches are further described for optimizing the encoder search criterion for the motion estimation process for residual prediction, and embodiments are described to optimize the mode parameters for the proposed residual prediction jointly with inter and intra prediction techniques.

An exemplary method is provided for coding a video in a bitstream, wherein the video comprises a plurality of pictures, including a current picture and at least one reference picture, where each picture comprises blocks of samples. In the method, a residual reference picture comprising at least one block is generated, the residual reference picture representing a difference between a corresponding block of the reference picture and a corresponding first-order prediction of the reference picture. In some embodiments, the residual reference picture includes information regarding residuals of the entire corresponding reference picture; in other embodiments, the residual reference picture includes information regarding residuals only for a portion of the corresponding reference picture (e.g. information regarding residuals of one or more particular blocks of the reference picture, which may be identified using block-level flags in the bitstream). The residual reference picture is filtered to generate a filtered residual reference picture. For at least a current block in the current picture: (i) a first-order prediction of the current block is formed using e.g. inter or intra prediction; (ii) residuals of the current block are predicted from a residual reference block in the filtered residual reference picture using motion-compensated prediction; and (iii) the first-order prediction and the predicted residuals are combined to generate a composite prediction signal for the current block.

In some such methods, a flag is signaled in the bitstream at the block level indicating whether to predict residuals of the current block from the de-noised reference picture.

In some embodiments, filtering the residual reference picture may include taking an absolute value of at least some of the samples in the residual reference picture. In such embodiments, a sign value may be signaled in the bitstream for the current block, and the predicting of residuals of the current block includes multiplying the residual reference block by the sign value. In some embodiments, a weighting factor is signaled in the bitstream for the current block, and the predicting of residuals of the current block includes multiplying the residual reference block by the weighting factor. In some embodiments, filtering the residual reference picture includes applying a threshold to the residual reference picture such that residual values below the threshold in the residual reference picture are zero in the de-noised residual reference picture. The threshold may be selected adaptively to substantially achieve a predetermined ratio k for each picture, where k is the ratio of the number of samples below the threshold to the number of samples above the threshold in the current picture. In some embodiments, filtering the residual reference picture may include quantizing sample values in the residual reference picture. In some embodiments, filtering the residual reference picture includes applying a linear filter to the residual reference picture, where coefficients of the linear filter are signaled in the bitstream.

The generation of the residual reference picture may include subtracting a first-order prediction of the reference picture from either a filtered or an unfiltered reconstruction signal of the reference picture. An indication of whether to use the filtered or the unfiltered reconstruction signal may be signaled in the bitstream.

A residual motion vector may be signaled in the bitstream. In this case, predicting residuals includes identifying the residual reference block using the residual motion vector.

Video encoders and decoders using the methods set forth herein are also described.

Systems and methods herein provide novel techniques for prediction of pixel values. Such techniques can be used by both encoders and decoders. Prediction of a pixel results in a pixel value that, in an encoding method, can be subtracted from an original pixel input value to determine a residual that is encoded in the bitstream. In a decoding method, a residual can be decoded from the bitstream and added to the predicted pixel value to obtain a reconstructed pixel that is identical to or approximates the original input pixel. Prediction methods as described herein thus improve the operation of video encoders and decoders by decreasing, in at least some implementations, the number of bits required to encode and decode video. Further benefits of exemplary prediction methods to the operation of video encoders and decoders are described in the Detailed Description.

BRIEF DESCRIPTION OF THE DRAWINGS

A more detailed understanding may be had from the following description, presented by way of example in conjunction with the accompanying drawings, which are first briefly described below.

FIG. 4A: original picture. FIG. 4B: its prediction residual picture. FIG. 4C: the reconstructed residual picture of one of the previously coded pictures.

DETAILED DESCRIPTION

Exemplary Block-Based Encoding and Decoding Systems and Methods.

Figure 1:
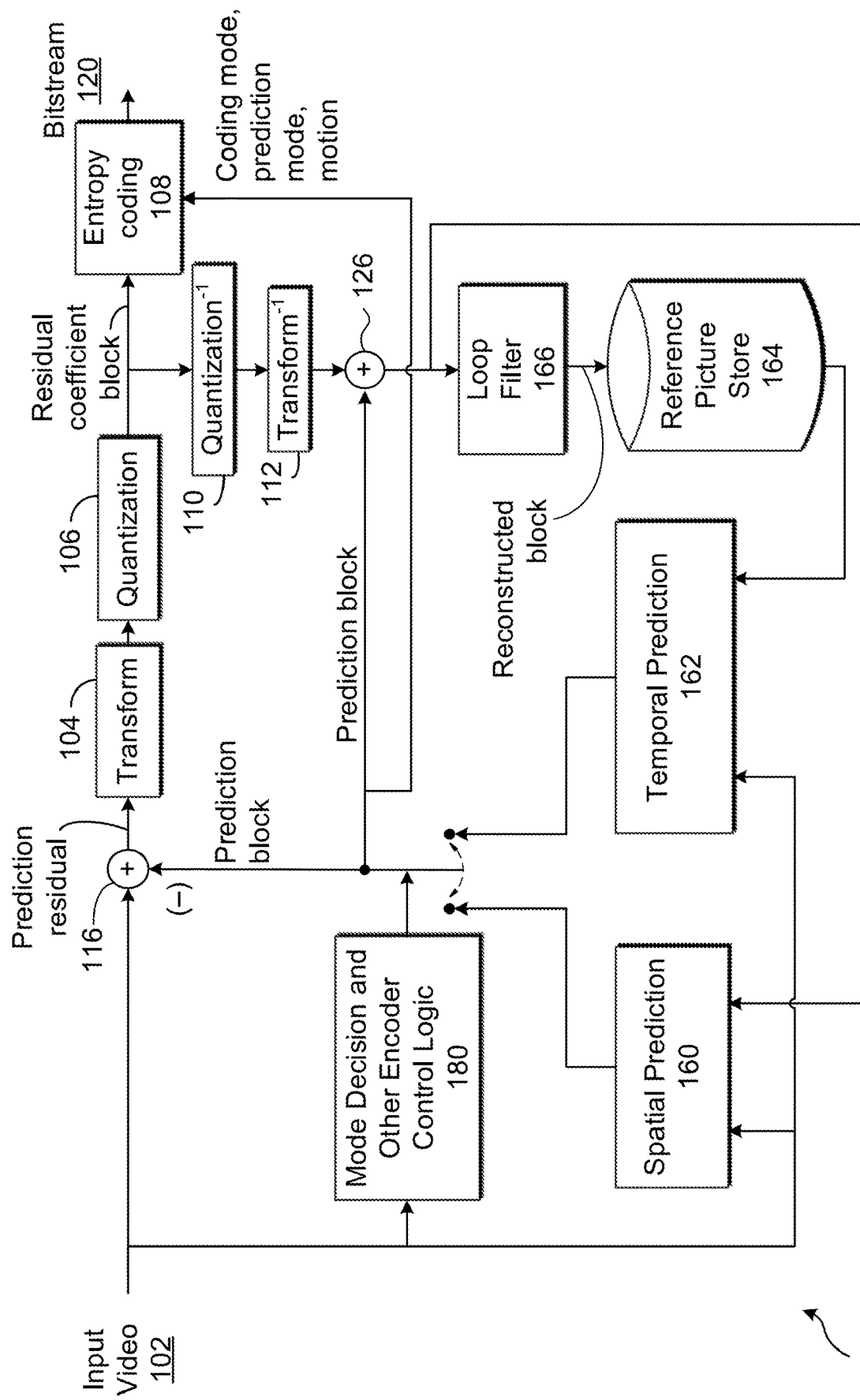
FIG. 1 is a functional block diagram illustrating an example of a block-based video encoder.

FIG. 1 is a functional block diagram of a block-based hybrid video encoding system. The input video signal 102 is processed block by block. In HEVC, extended block sizes (called a "coding unit" or CU) are used to efficiently compress high resolution (1080p and beyond) video signals. In HEVC, a CU can be up to 64×64 pixels, and bigger block size up to 256×256 is allowed in JEM. A CU can be further partitioned into prediction units (PU), for which separate prediction methods are applied. For each input video block (MB or CU), spatial prediction (160) and/or temporal prediction (162) may be performed. Spatial prediction (or "intra prediction") uses pixels from the already coded neighboring blocks in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given video block is usually signaled by one or more motion vectors which indicate the amount and the direction of motion between the current block and its reference block. Also, if multiple reference pictures are supported (as is the case for the recent video coding standards such as H.264/AVC or HEVC), then for each video block, its reference picture index is sent additionally; and the reference index is used to identify from which reference picture in the reference picture store (164) the temporal prediction signal comes. After spatial and/or temporal prediction, the mode decision block (180) in the encoder chooses the best prediction mode, for example based on the rate-distortion optimization method. The prediction block is then subtracted from the current video block (116); and the prediction residual is de-correlated using transform (104) and quantized (106) to achieve the target bit-rate. The quantized residual coefficients are inverse quantized (110) and inverse transformed (112) to form the reconstructed residual, which is then added back to the prediction block (126) to form the reconstructed video block. Further in-loop filtering such as de-blocking filter and Adaptive Loop Filters may be applied (166) on the reconstructed video block before it is put in the reference picture store (164) and used to code future video blocks. To form the output video bit-stream 120, coding mode (inter or intra), prediction mode information, motion information, and quantized residual coefficients are all sent to the entropy coding unit (108) to be further compressed and packed to form the bit-stream.

Figure 2:
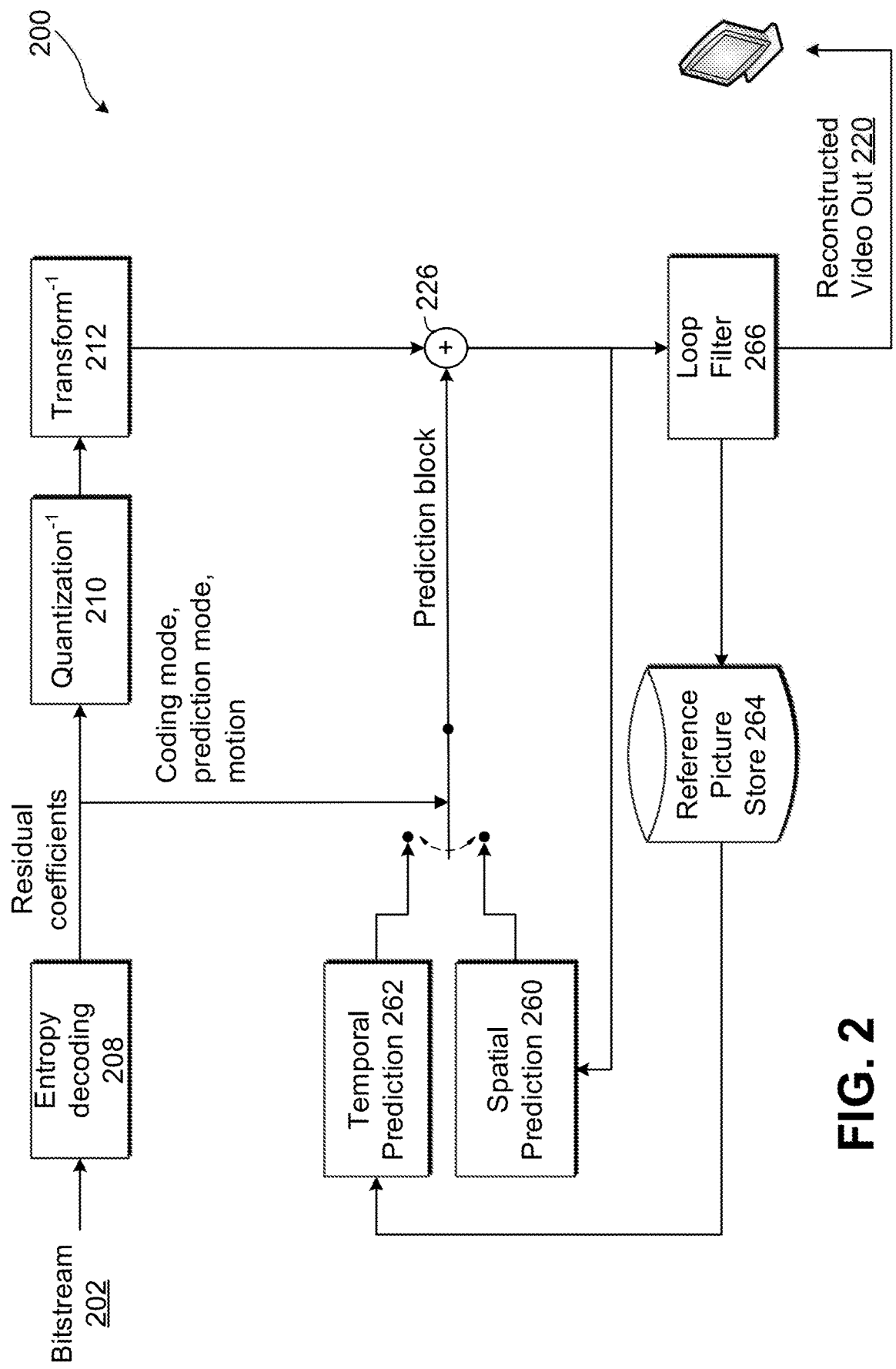
FIG. 2 is a functional block diagram illustrating an example of a block-based video decoder.

FIG. 2 is a functional block diagram of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

Prediction of Motion Compensated Residuals

In modern video codecs, motion compensated prediction (MCP) is known for its high efficiency in removing temporal redundancy by exploiting temporal correlations between pictures, and has been widely adopted in most of the state-of-the-art video codecs. In the past decade, researches have reported that there is still structure-wise similarity between the residual pictures of temporal neighboring pictures after motion compensated prediction. Thus, several prediction techniques aiming at further reducing prediction residuals have been proposed in literature, such as spatial-domain, frequency-domain, and temporal-domain residual predictions.

Spatial-Domain Residual Prediction.

Figure 3:
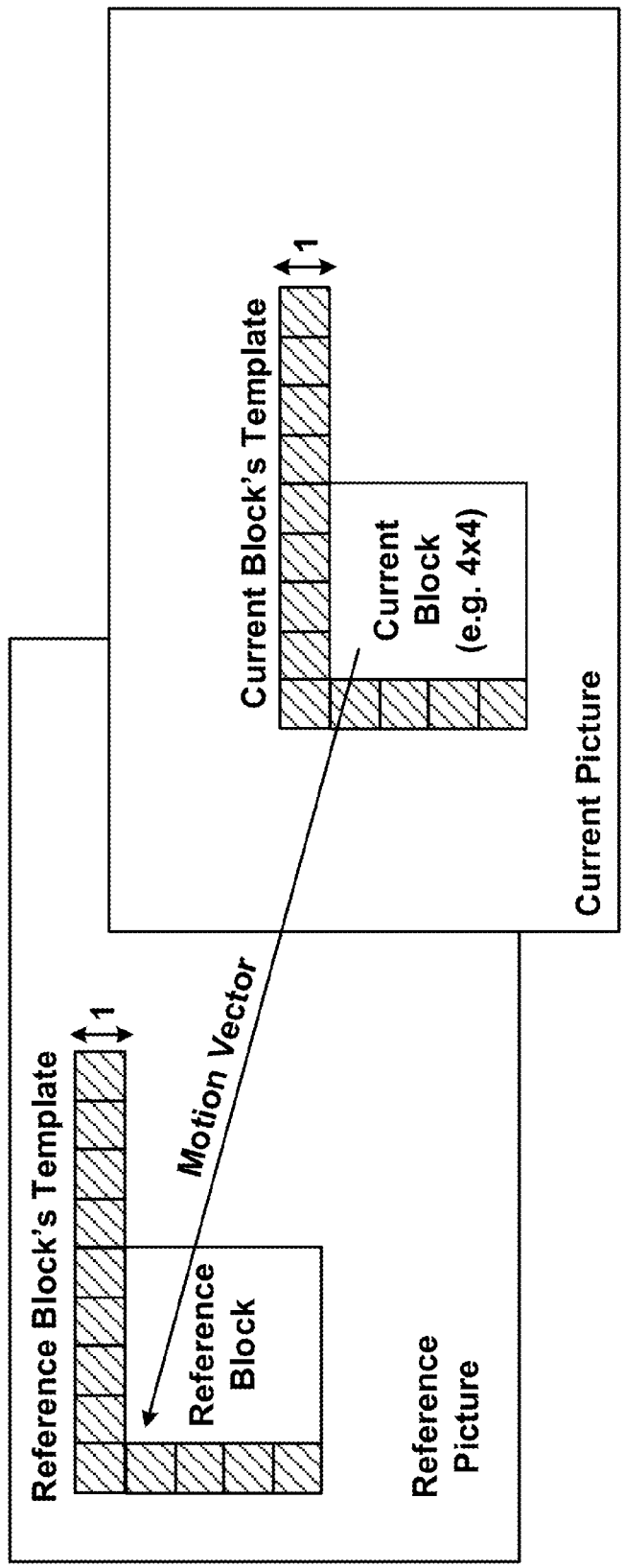
FIG. 3 is a schematic diagram illustrating spatial relationship between blocks and templates.

Based on the observation that residuals generated with MCP still have spatial correlation or texture structure, spatial-domain residual prediction techniques exploit such remaining signal correlation by performing intra prediction with reference samples taken from the residual signal of causal neighboring samples. As depicted in FIG. 3, this residual signal of those reference samples is derived by subtracting the prediction signal of the immediate inverse-L-shape neighborhood (referred to as template) from the reconstruction signal of the template. The prediction signal of the template is obtained using MCP from the corresponding signal in the reference picture. Then, the residual of the template is used as the reference for performing intra prediction in residual domain. The result of the intra prediction is the predicted residual for the current block, which is regarded as second-order prediction; it is then added up with the motion compensated prediction to form the final prediction. The same transform and quantization procedures as for inter modes are applied directly.

Frequency-Domain Residual Coefficients Prediction.

Rather than applying intra prediction based on the residual signal of the template, some approaches estimate quantized transform coefficients directly through transform-domain motion compensated prediction. This technique aims at reducing the number of coding bits consumed for coding quantized residual coefficients, and thus the reconstruction picture quality may not be affected. After the current frame is coded, coefficients corresponding to the same frequency band are ordered together to form a frequency plane. For example, if a 4×4 transform is applied, each coded picture, including the current one and reference pictures, is divided into 16 equal-sized frequency planes. Then, the block-based motion compensated prediction is applied on a plane-by-plane basis. To save the motion vector (MV) overhead, these frequency planes may share the same motion information. The residual coefficients in each frequency plane are re-mapped to the original transform order in the coded current picture, and then the residual coefficients of each transform unit in the current picture are encoded in the same way as that used for coding of quantized transform coefficients.

Temporal-Domain Residual Prediction.

Due to variable block size transform, it is not easy to acquire coefficients corresponding to the same frequency band without re-transform coding and re-quantizing reference pictures. One low-complexity approach performs motion compensated prediction with the reconstructed residuals in temporal domain rather than a frequency domain. The reference pictures in use are formed by reconstructed residuals instead of reconstructed pixels. The motion compensated residual prediction signal is then added up with pixels' motion compensated prediction signal to form the final prediction signal. The same transform and quantization procedures as for inter modes can be applied directly.

Challenges in Residual Prediction

Figure 4A:
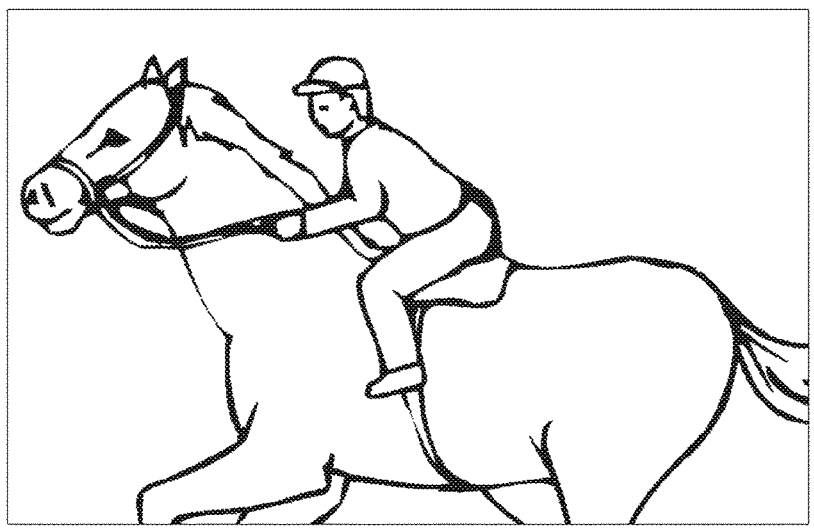
FIGS. 4A-4C illustrate the temporal similarity between a prediction residual picture and the reconstructed residual picture of a previously coded picture.
Figure 4B:
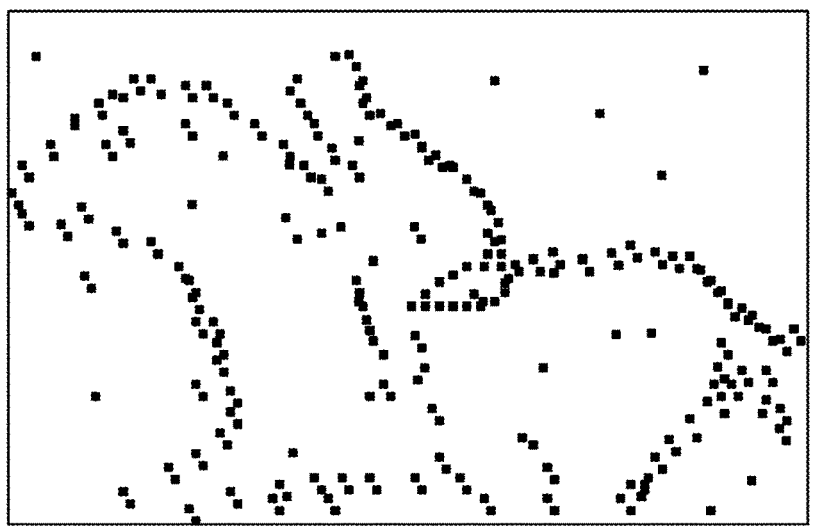
Figure 4C:
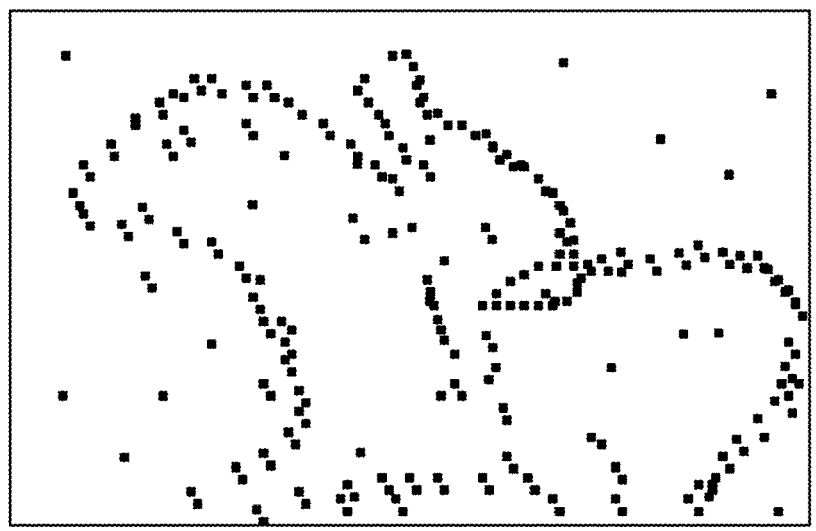

Residual prediction using motion compensated prediction provides an opportunity to further improve the coding efficiency for inter prediction residuals. As can be seen in FIGS. 4A-4C, structure-wise correlation between residual pictures in temporal space is still present. Similar moving boundaries (e.g. the jockey's body and the horse's head highlighted in red and blue, respectively) or edges (e.g. the saddle marked in orange) can be easily observed in both the prediction residuals of the current picture (FIG. 4B) and the reconstructed residuals of a previous picture (FIG. 4C). However, the techniques described above directly use the reconstructed residuals to generate the residual predictors. Those techniques do not fully take advantage of reconstructed residuals for improving overall coding performance.

One issue with residual prediction techniques arises because reconstructed residual signals are likely to be zero-mean high-frequency signals which follow the Laplace distribution in statistics. This results in positive and negative sign values being substantially equally distributed and random. With these sign values, even though two blocks are structure-wise similar to each other, they are still considered mismatching from block matching aspect due mainly to mismatching in sign values. Therefore, when motion estimation is performed in the residual domain, it is difficult to find a good predictor with similar structural information for the residual block. This may reduce the effectiveness of the MCP-based residual prediction.

Another issue with residual prediction techniques arises because in-loop filtering may affect the prediction quality for residuals either positively or negatively. For example, suppression of blocking artifacts by using a de-blocking filter is equivalent to transferring this artifact to residuals' reference pictures, if residual reference pictures are constructed by subtracting the prediction signal from the filtered reconstruction signal. Since such artificial adjustment is not always correlated with residuals, an adaptation mechanism is thus desired; otherwise, poor residual prediction performance may result.

A further issue with residual prediction techniques arises because, while structural information in a current residual block may be predicted to some extent, the remaining information in a current residual block resides in high frequency range, which is very difficult to predict. Because residual prediction using MCP aims at predicting structure information, residuals' reference pictures with any tiny intensity variation (e.g. isolated peaks) do not provide much benefit in prediction performance much but, on the contrary, would pollute prediction residuals in structural-less regions, resulting in less efficient transform coding results. As the tiny intensity variation looks like noise, a de-noising filtering which can be utilized to filter out such noise should be required.

Another issue with residual prediction techniques arises because residuals are sparse signals in reference pictures, and their motion fields therefore exhibit more randomness than motion fields in the pixel domain. It is not necessarily optimal to apply the same search strategy and motion information coding techniques that are optimized particularly for motion of pixel domain to the motion of residual domain.

Residual Prediction Techniques in Exemplary Embodiments

In this disclosure, systems and methods are disclosed for improving the prediction efficiency for residual prediction using motion compensated prediction method. The disclosed systems and methods are further extended to not only the residuals of inter coded blocks but also to the residuals of intra coded blocks.

Disclosed herein are residual prediction techniques using motion compensated prediction and processed residual reference pictures, e.g. residual reference pictures that have been filtered to generate a de-noised residual reference picture.

The present disclosure further specifies a generation process for residual reference pictures. These pictures can be generated adaptively with or without considering the in-loop filtering effect, followed by exemplary de-noising filter designs that are provided for enhancing the quality of these pictures. Compression methods are described for reducing the storage size of reference pictures.

In some embodiments, the syntax design for residuals' motion information is simplified to reach an optimal tradeoff between syntax overhead and coding performance.

Exemplary approaches are described for optimizing the encoder search criterion for the motion estimation process for residual prediction. Embodiments are further described to optimize the mode parameters for the proposed residual prediction jointly with inter and intra prediction techniques.

Figure 5:
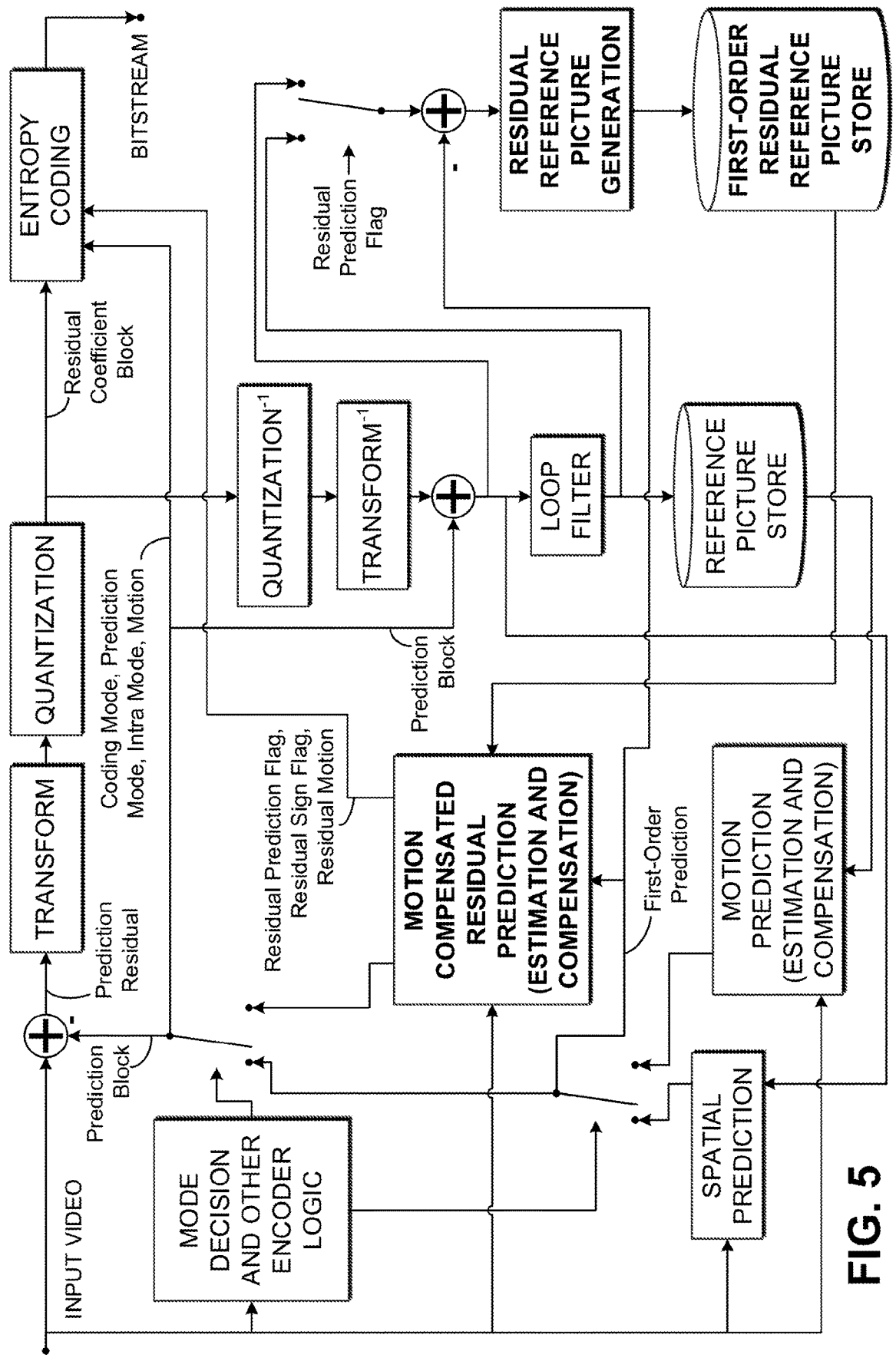
FIG. 5 is a functional block diagram of a video encoder using motion compensated residual prediction according to exemplary embodiments.

FIG. 5 is a block diagram of an exemplary proposed video encoder. Similar to the conventional video encoder shown in FIG. 1, the spatial prediction module and the motion estimation and compensation module are invoked first to produce intra and inter prediction signals, respectively. The former is synthesized by extrapolating reconstructed pixels sitting immediately at the closest causal neighborhood, and one extrapolation method that is the best for representing the current block is indicated; the latter is formed by matching the current block to a reference block in reference picture(s) using the optimized motion vector(s) (MVs). An additional module, referred to as motion compensated residual prediction (MCRP), is then invoked before the transform coding module.

For ease of explanation in this disclosure, the following terms are used. The residual generated by subtracting the pixel-domain intra/inter prediction from the original signal is referred to as the first-order residual. The residual generated by subtracting the residual-domain inter prediction from the first-order residual is referred to as the second-order residual. The pixel-domain intra/inter prediction and the residual-domain intra/inter prediction are referred to as the first-order prediction and the second-order prediction, respectively. MVs used for the first-order prediction and the second-order prediction are referred to as pixel-domain MVs and residual-domain MVs, respectively. The residual generated by inverse-quantizing and inverse-transforming the coefficients that are produced by transforming and quantizing the second-order residual is referred to as the reconstructed second-order residual. The residual generated by adding the reconstructed second-order residual and the second-order prediction is referred to as the reconstructed first-order residual.

Figure 6:
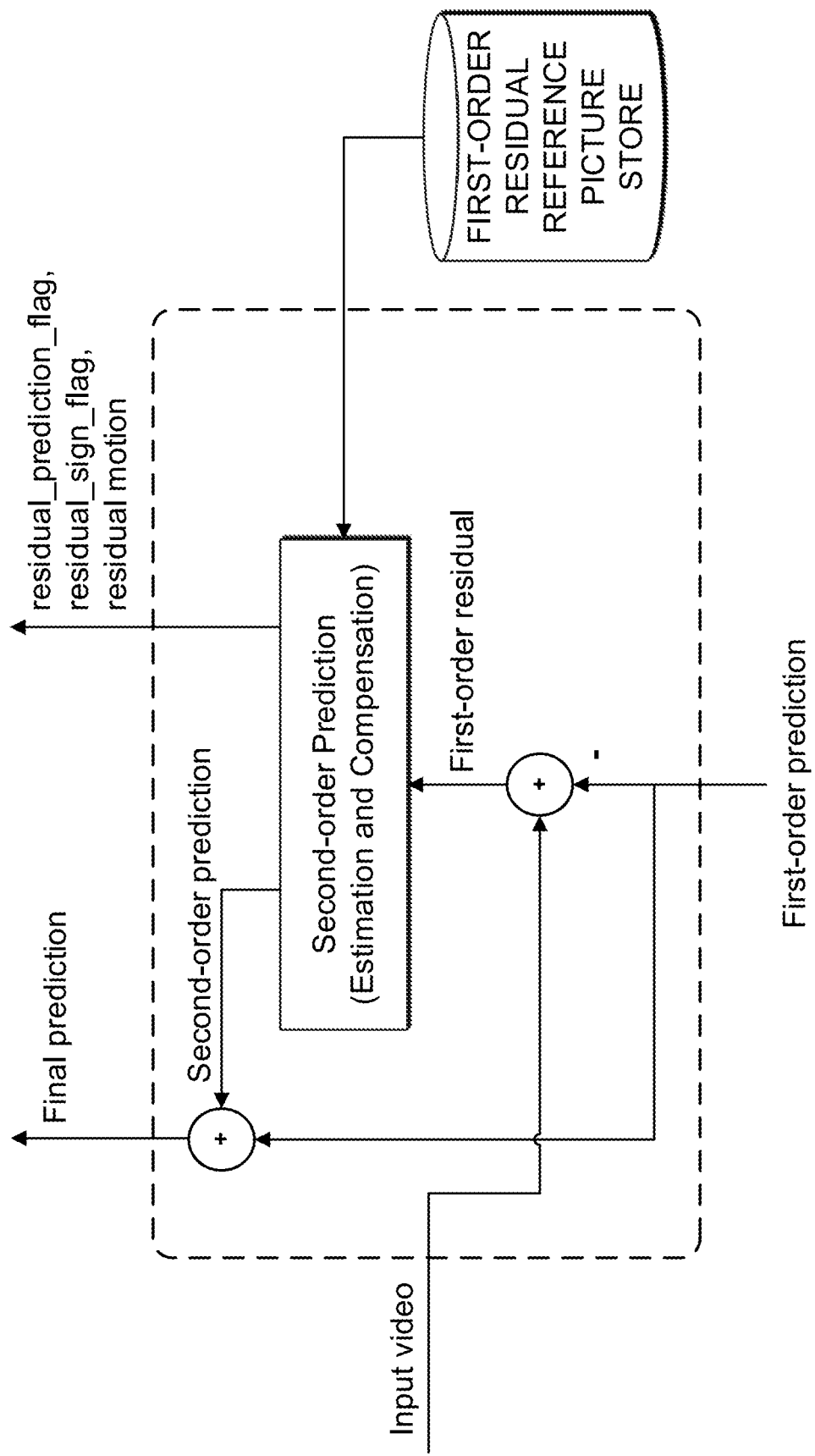
FIG. 6 is a functional block diagram of a motion compensated residual prediction module for use in a video encoder in exemplary embodiments.

As depicted in FIG. 6, in an exemplary embodiment, an encoder employing MCRP performs motion estimation for searching an optimal residuals' MV and then performs motion compensation from the residual reference picture store using the optimal residual MV to get a prediction block (the residuals' prediction signal) in the residual domain. This residuals' prediction signal (second-order prediction) is added with the inter or intra prediction signal (first-order prediction) to form the composite prediction signal. After that, the original signal is subtracted from this final prediction signal and the final residual signal (second-order residual) for coding is thus produced.

The transform and quantization modules are applied to the second-order residuals which are then entropy-coded and output to the bit-stream. After the inverse quantization and inverse transform modules are applied, the second-order residual signal is reconstructed and is then added up with the first-order prediction and second-order prediction signal together to form the reconstructed signal prior to the loop filter module. Further, the loop filter module (e.g. de-blocking, sample adaptive offset and adaptive loop filter) is applied to the reconstructed video signal for output. The reconstructed video signal (before or after the loop filter module) is subtracted from the first-order prediction video signal (including inter and intra prediction signals), and the resulting video signal (the reconstructed first-order residual) is filtered by using a low-pass filter in a module labeled the Residual Reference Picture Generation module in FIG. 5.

To save storage size, the Residual Reference Picture Generation module may additionally truncate the sign bit and some least significant bits of each sample from the filtered signals, or may clip the residual within a certain bit range. The output signal of this module is then stored in the first-order residual reference picture store for future use in the motion compensated residual prediction module. Depending on the prediction performance of intra and inter prediction, sometimes there is not much remaining first-order residual signal to be predicted, and thus in the rate-distortion sense it is not always worth paying the signaling overhead for the second-order prediction. Therefore, to improve the coding performance of MCRP, in some embodiments a flag residual_prediction_flag is signaled at a certain block level (e.g. CU or PU level) to indicate the use of MCRP. When this flag is set equal to 1, another flag residual_sign_flag is signaled at the same block level to indicate whether the magnitude of the second-order prediction signal should be positive or negative. Another flag residual_selection_flag is signaled at slice, picture or sequence level for the proposed encoder to switch between two methods that are used to generate the first-order residual reference pictures. These residual reference pictures may then be filtered to improve quality and be truncated to save storage size.

Figure 7:
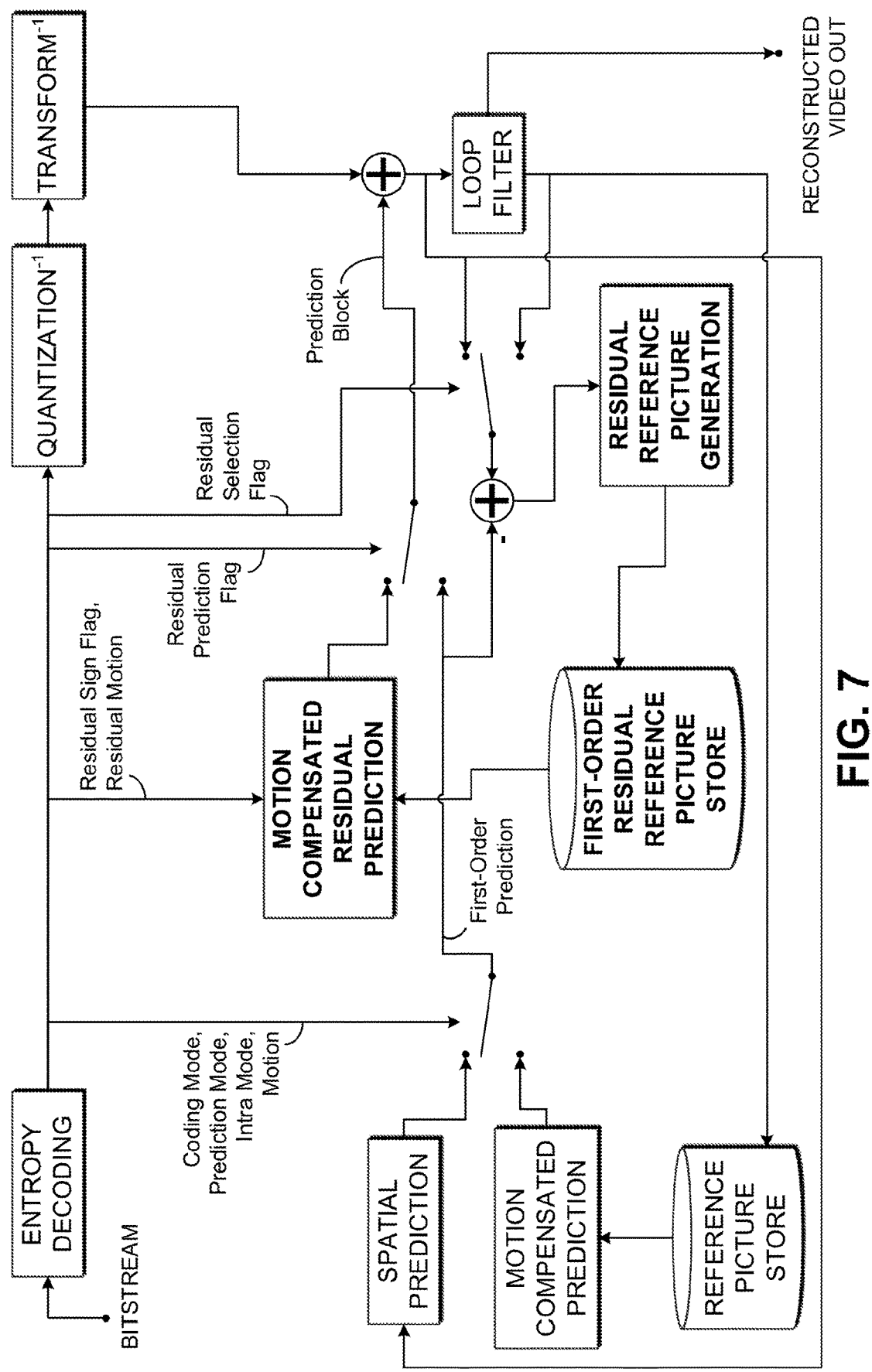
FIG. 7 is a functional block diagram of a video decoder using motion compensated residual prediction according to exemplary embodiments.
Figure 8:
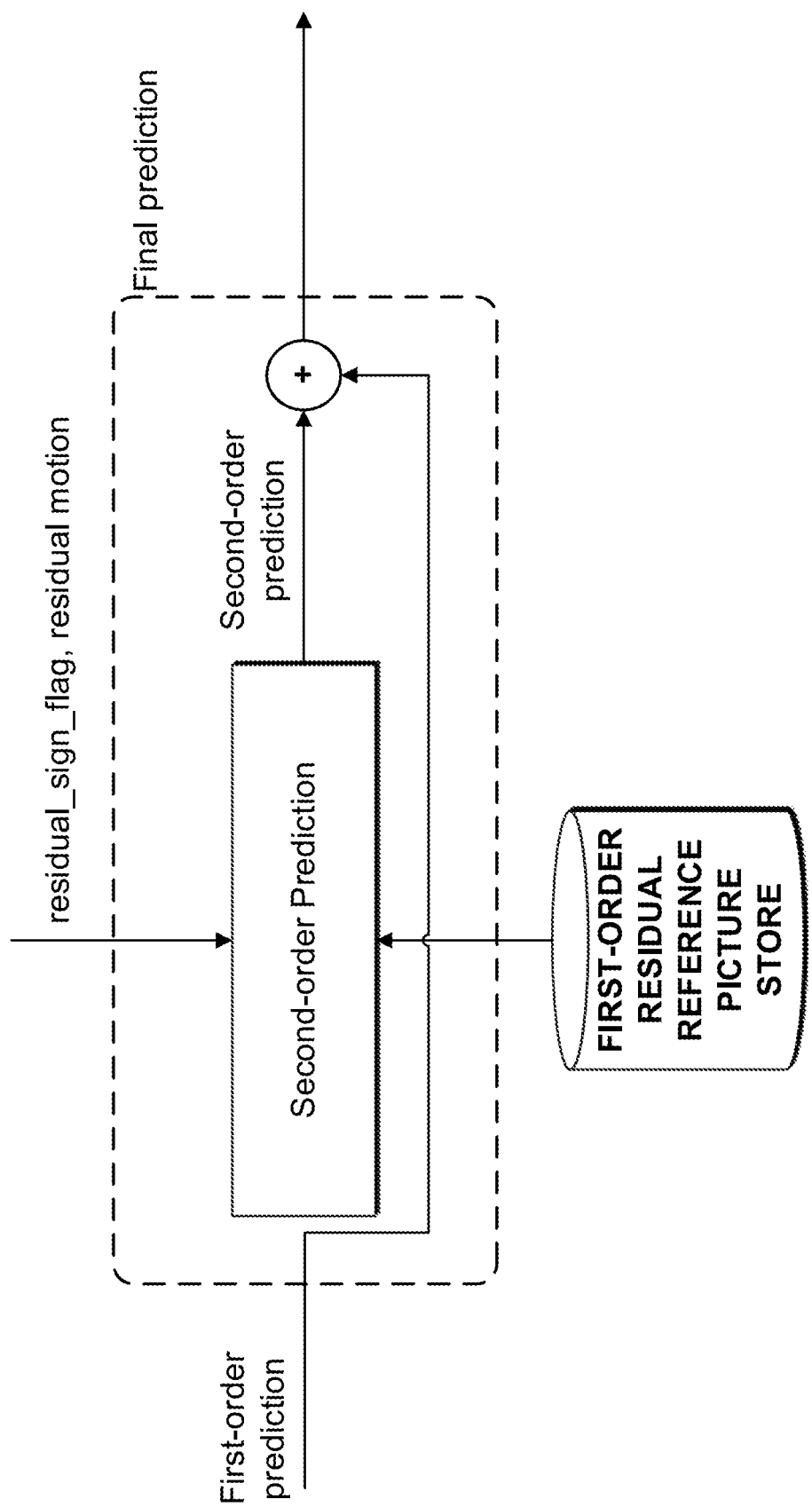
FIG. 8 is a functional block diagram of a motion compensated residual prediction module for use in a video decoder in exemplary embodiments.

FIG. 7 is a block diagram of an exemplary video decoder that decodes the bit-stream produced by the encoder of FIG. 5. The bit-stream is parsed by the entropy decoder, and the obtained residual coefficients are inverse-quantized and inverse-transformed to reconstruct the residuals. Depending on the received prediction information (intra mode for intra prediction and motion information for inter prediction), the first-order prediction signal is generated by performing either the pixel-domain intra or inter prediction. If the received flag residual_prediction_flag is equal to 1, the first-order prediction is further added up with the second-order prediction signal produced by performing MCRP (as depicted in FIG. 8), and the final prediction signal is thus generated; otherwise (if residual_prediction_flag is equal to 0), the first-order prediction signal serves as the final prediction signal directly without any change. According to the flag residual_sign_flag, the magnitude of the second-order prediction signal could be positive when residual_sign_flag is equal to 1 or negative when residual_sign_flag is equal to 0. Later, the final prediction signal and the reconstructed residual signal are added up to form the reconstructed video prior to the loop filter module.

The reconstructed video may additionally go through the loop filtering processes before being stored in the reference picture store to be displayed and/or to be used to decode future video signals. If the received flag residual_selection_flag is equal to 1, the first-order prediction video is subtracted from the reconstructed video after the loop filter module to form the reconstructed first-order residual picture; otherwise (if residual_selection_flag is equal to 0), the reconstructed video before the loop filter module is used in the aforementioned subtraction. In the Residual Reference Picture Generation module depicted in FIG. 7, the resulting reconstructed first-order residual may be filtered, and its sign bit and least significant bits may be further truncated before being stored in the first-order residual reference picture store for future use in the prediction process of MCRP.

In this disclosure, systems and methods are described with residual prediction method using MCRP built upon the proposed encoder and decoder in FIG. 5 and FIG. 7. In the following portion of the disclosure, the section "Residual Prediction Using Motion Compensation" presents exemplary methods for performing MCRP and the associated reconstruction processes. The section "Generation of Residual Reference Pictures" describes exemplary processes for first-order residual reference picture generation, de-noising filter design and storage. In the section "Signaling of Motion Compensated Residual Prediction," exemplary signaling design for flags related to MCRP are described, and exemplary coding methods for the residual-domain MVs and reference picture selection for MCRP are presented. The section "Encoder-Only Search Strategies for Residual Domain MV" describes exemplary encoder-only residuals' motion search strategies.

Residual Prediction Using Motion Compensation

In exemplary embodiments, motion compensated residual prediction (MCRP) operates to predict first-order residuals generated from intra or inter prediction. In one embodiment, each PU has an additional MV indicating the position in the residual reference picture from which it is predicted. The resulting prediction can be expressed as the following equation, in which $\tilde{P}[x|m]$ denotes the first-order prediction signal of a certain sample x located at a position x within a picture, m contains motion information or intra directions depending on the prediction mode used for generating $\tilde{P}[x|m]$, $\tilde{R}[x+v]$ represents the second-order prediction signal for x's residual, v is the motion vector used for performing MCRP, and $P[x|m,v]$ denotes the composite MCRP prediction signal of sample x located at x using m and v.

$$P[x|m,v]=\tilde{P}[x|m]+\tilde{R}[x+v] \quad (1)$$

With MCRP, high-frequency components in a block can be better represented. In general, deriving prediction signals from referencing reconstructed pixels could result in worse prediction performance on high-frequency components of a block. This is because most of these referenced pixels have already lost the accuracy of their high-frequency information to some extent due to quantization, but some of these pixels' structural information still remains in the reconstructed residual signal. In order to compensate for the loss, the proposed MCRP takes advantage of this observation to perform an additional motion compensation with first-order residual reference pictures indicated by its associated residual-domain MV to obtain a block that can be used to represent the structural information of the current block.

However, such structural information is largely composed of high-frequency difference signals including quantization noise. The sign values of the signals are quite random and the magnitude of the signals may be shifted due to different quantization step sizes applied. Both are negative factors that would limit the performance of residual prediction. In an exemplary embodiment, a residual prediction with a linear model for correction is proposed and may be expressed as follows:

$$P[x|m,v]=\tilde{P}[x|m]+W[x]*|\tilde{R}[x+v]|+O[x] \quad (2)$$

where $W[x]$ and $O[x]$ denote respectively a weighting factor and an offset value, the operator $|y|$ outputs the magnitude of the input variable y, and $(W[x]*|\tilde{R}[x+v]|+O[x])$ is the general form of the proposed second-order prediction. In a proposed embodiment of second-order prediction, the absolute value of $\tilde{R}[x+v]$ is taken, and a linear model is applied to each $|\tilde{R}[x+v]|$ in a prediction block.

Although Eq. (2) applies $W[x]$ and $O[x]$ to each residual sample at each position and may be used in some embodiments to address the aforementioned problems, this solution could outweigh the prediction benefit of MCRP due to the costly overhead. In exemplary embodiments, only one weighting factor and one offset value per block are applied to approximate the individual weighting factor and offset ($W[x]$ and $O[x]$) for all residuals in the block. Moreover, because these configurations, $(W[x],O[x])\in\{(-1,0),(1,0)\}$, have already captured most of the prediction benefit from MCRP and have achieved a balance between residual prediction accuracy and signaling overheads, a simplified form of Eq. (2) may be given as follows:

$$P[x|m,v]=\tilde{P}[x|m]+S[x]*|\tilde{R}[x+v]| \quad (3)$$

where $S[x]$ denotes the estimated sign value of x and is shared across all samples in a block, and $S[x]*|\tilde{R}[x+v]|$ is the a simplified form of the proposed second-order prediction. In this equation, positive and negative sign values are represented by 1 and −1, respectively. In an exemplary embodiment of second-order prediction, the absolute value of $\tilde{R}[x+v]$ is taken, and a sign value is applied to each $|\tilde{R}[x+v]|$ in a prediction block. Exemplary embodiments employ fewer syntax elements (using $S[x]$ to replace both $W[x]$ and $O[x]$) to support the second-order prediction.

With Eq. (3), the reconstruction signal $\hat{I}[x]$ can be generated by using Eq. (4), in which the reconstructed second-order residual signal $\hat{R}[x]$, the first-order prediction signal $\tilde{P}[x|m]$ and the second-order prediction signal $S[x]*|\tilde{R}[x+v]|$ are added up together.

$$\hat{I}[x]=P[x|m,v]+\hat{R}[x]$$

$$=\tilde{P}[x|m]+S[x]*|\tilde{R}[x+v]|+\hat{R}[x] \quad (4)$$

In case MCRP is not enabled, $\hat{R}[x]$ is not the reconstructed second-order residual signal, but is the reconstructed residual generated by inverse-quantizing and inverse-transforming the coefficients that are produced by transforming and quantizing the first-order residual. Since its order is the same as the first-order residual, it is added with the first-order prediction signal to form $\hat{I}[x]$ as follows:

$$\hat{I}[x]=\tilde{P}[x|m]+\hat{R}[x] \quad (5)$$

Generation of Residual Reference Pictures

The following disclosure describes in greater detail embodiments of generation processes, de-noising processes and storage of the first-order residual reference pictures.
First-Order Residual Reference Picture Generation.

After the reconstruction signal $\hat{I}[x]$ in Eq. (4) or (5) is produced, the first-order residual reference pictures may be built. In exemplary embodiments, the first-order prediction $\tilde{P}[x|m]$ is subtracted from $\hat{I}[x]$. This gives $$\tilde{R}[x] = \hat{I}[x] - \tilde{P}[x|m] \quad (6)$$

$$= \begin{cases} \hat{R}[x] + S[x] * |\hat{R}[x+v]|, & \text{if MCRP is applied;} \\ \hat{R}[x], & \text{otherwise.} \end{cases}$$

As Eq. (6) indicates, depending on the use of MCRP, each block in the residual reference pictures can be composed of either the reconstructed second-order residual signal plus residual prediction signal or solely the reconstructed first-order residual signal. The reason for not using $\hat{R}[x]$ directly in place of Eq. (6) when MCRP is applied is that $\hat{R}[x]$ represents second-order residuals, the order of which mis-aligns that of inter and intra prediction residuals (first-order residuals). As the purpose of MCRP is to predict first-order residuals, the signals stored in reference pictures should also be represented by using the same order. So, the reconstructed residual signal and residual prediction signal are added up together to reconstruct the first-order residual. As a result, all the signals in the residual reference pictures are of first-order residuals, and thus can be directly used to perform residual prediction for inter and intra prediction residuals.

To further improve the performance of MCRP, in some embodiments, either the filtered or unfiltered reconstruction signal may be used for representing the $\hat{I}[x]$ in Eq. (6). As illustrated in FIG. 5 and FIG. 7, such adaptation may depend on the choice of the residual selection flag (residual_selection_flag), which may be signaled at the slice, picture or sequence level. It is known that the purpose of the loop filter module is to improve perceptual quality and reduce compression distortion. However, such adjustment applied to the reconstruction signal may not always be correlated with enhancing pixels' structural information. For example, supposing that filtered reconstruction signal is used for representing $\hat{I}[x]$, removing blocking artifact from it through a de-blocking filter is equivalent to transferring this artifact to residuals' reference pictures. This behavior can be interpreted by using the following equation:

$$\tilde{R}[x] = (\hat{I}[x] + \Delta[x]) - \tilde{P}[x|m]$$

$$= (\hat{I}[x] \tilde{P}[x|m]) + \Delta[x] \quad (7)$$

where $\hat{I}[x] + \Delta[x]$ may be the filtering result of de-blocking filter. As compared with Eq. (6), this equation introduces an offset value $\Delta[x]$ for each sample to suppress false edges within $\hat{I}[x]$. When this offset works effectively, the suppressed false edges are transferred to $\hat{I}[x] - \tilde{P}[x|m]$ completely, resulting in more high-frequency edges being added into first-order residual reference pictures. Due to the uncertainty as to whether or not false edges may be added into the residual reference pictures, the residual prediction performance may thus be suppressed if the source used for $\hat{I}[x]$ is always from the filtered (or unfiltered reconstruction) signal. As such, the adaptation to switch between the filtered and unfiltered reconstruction signals helps improve the performance of motion compensated residual prediction.

De-Noising Filtering for Residual Reference Pictures.

Figure 9:
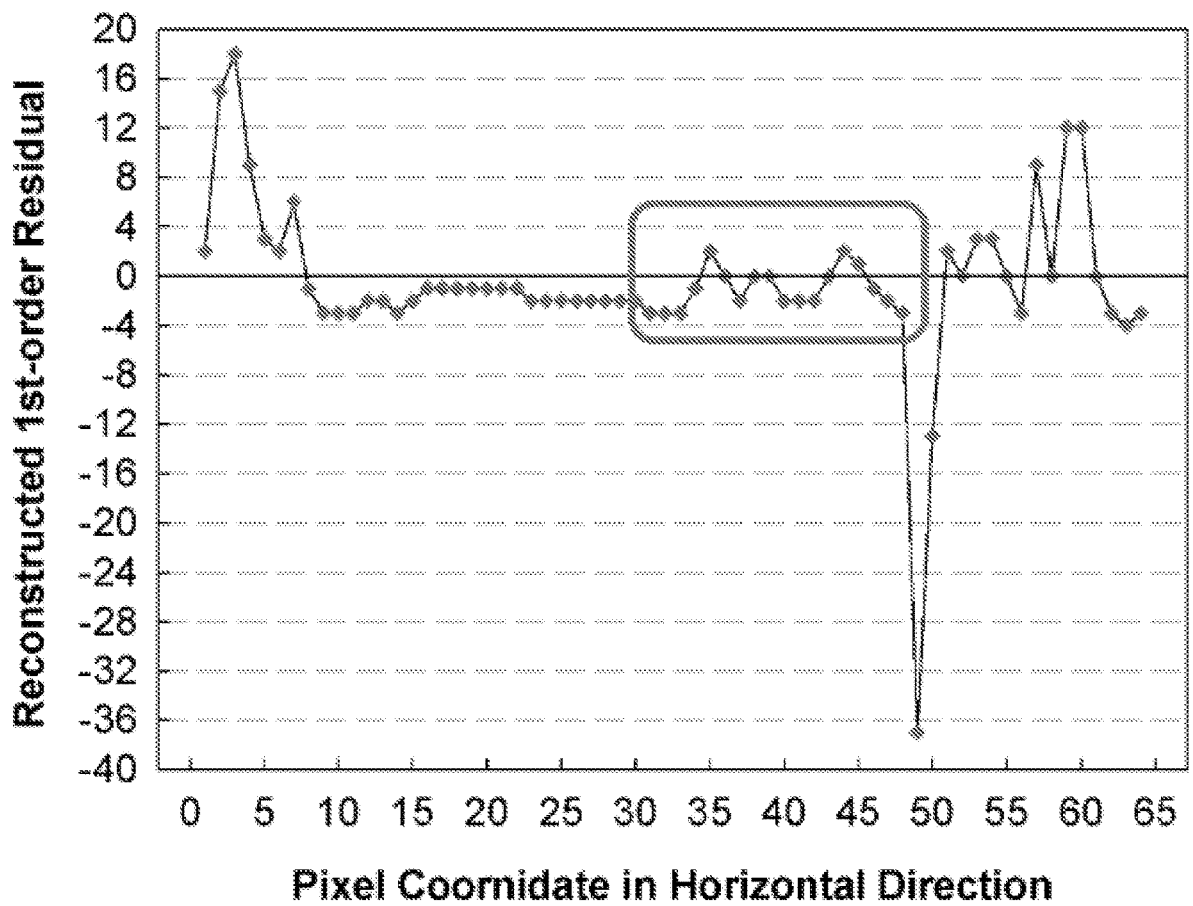
FIG. 9 is a graph illustrating an example of noisy signals in a raster scanning line of a reconstructed first-order residual reference picture. The vertical axis represents the value of reconstructed first-order residual, and the horizontal axis represents the horizontal pixel coordinate.

Residual reference pictures can be quite noisy. As can be seen from FIG. 9, noise signals in the reconstructed first-order residual reference pictures may oscillate around zero rapidly within a few samples. To suppress the noise, this section describes exemplary de-noise filtering processes, which can be selected or disabled based on a block, slice, picture, or sequence basis for residual reference pictures. One such process is truncation-based filtering (with rela-tively low complexity), and another is iterative least square error based filtering (with relatively more complexity).

Truncation-Based Filtering.

Truncation-based filters operate to screen out residual samples that have small intensity values in residual reference pictures. As MCRP focuses mainly on predicting structural information, such small variation does not benefit residual prediction performance much but, on the contrary, can pollute prediction residuals in structural-less regions, resulting in less compact transform coding results. Therefore, in exemplary embodiment, insignificant signals (i.e. $|\tilde{R}[x]| < T$) in residual reference pictures are filtered out by using a weak filtering process, which may be given by $$\tilde{R}'[x] = \begin{cases} 0, & \text{if } |\tilde{R}[x]| < T; \\ \tilde{R}[x], & \text{otherwise;} \end{cases} \quad (8)$$

where T is a threshold estimated from the residual pictures. For example, the value of T can be estimated as:

$$T = \mathrm{argmax}_t P(0 < |\tilde{R}[x]| \leq t) \leq k \text{ subject to } t \geq T_{min} \quad (9)$$

where P(.) denotes the probability of a given event, $T_{min}$ is a pre-determined threshold value that is used to prevent the resulting T from being too small, and k controls the ratio of filtered samples to whole picture samples. The value of T tends to be small when k is small, too.

The truncation-based filtering process performs well in the cases where structural information is less distorted (and thus more precise) after quantization and inverse quantization are applied. However, in other cases, structural information in residual reference pictures may become less precise due to a strong quantization effect, especially for low-rate conditions that quantization noise is often with higher variance and may distort the magnitude of $\tilde{R}[x]$ severely. Accordingly, it should be more conservative to manipulate $\tilde{R}[x]$, and therefore a strong filtering process may be applied to each $\tilde{R}[x]$ to suppress the noise, especially for those residuals having large magnitude. The principle of this strong filter is to apply a large quantization step size to each $\tilde{R}[x]$ to remove the quantization noise introduced by the quantization module. This filtering process can be represented by the following:

$$\tilde{R}'[x] = \lfloor \tilde{R}[x]/d + 0.5 \rfloor * d \quad (10)$$

where d is a positive real number and the operator $\lfloor . \rfloor$ outputs the largest integer that is equal to or smaller than the input value.

It is noted that this filtering process is equivalent to screening out a few least significant bits of $\tilde{R}[x]$, when the number of d in Eq. (10) is a power-of-2 and non-negative integer. The Eq. (10) can be thus implemented by using only a few addition and shift operations as follows:

$$\tilde{R}'[x] = ((\tilde{R}[x] + 2^{n-1}) >> n) << n \quad (11)$$

where n is a non-negative integer which determines the filtering strength. As both filters can be implemented using only addition, shift and/or branch operation, the impact on decoding complexity is negligible. The choice of weak or strong filter can be determined according to a control flag residual_filter_selection_flag present at slice, picture or sequence level. The residual_filter_selection_flag may also be signaled at the block level (e.g., CTU level) to adaptively select the residual filter for each local block.

In another embodiment, edge-aware de-noising filters and edge-preserving smoothing filters are also applicable for this purpose, for example median filters and bilateral filters.

Iterative Least Square Error Based Filtering.

Indiscriminately filtering residual reference pictures can result in degradation of residual prediction performance. For example, a sequence of consecutive non-isolated residual samples with small intensity values may also contain important structural information, but all of such residual samples may be screened out (that is, set to 0) by Eq. (8) and (10). In some embodiments, an off-line trained filter is applied for enhancing the quality of residual reference pictures. In exemplary methods, the encoder specifies a set of filter coefficients at the sequence level, and it may be decided at the picture and/or slice level whether to enable or disable the filter. This section describes embodiments in which the filter coefficients may be derived off-line with a given set of reconstructed pictures generated using training sequences.

Figure 10:
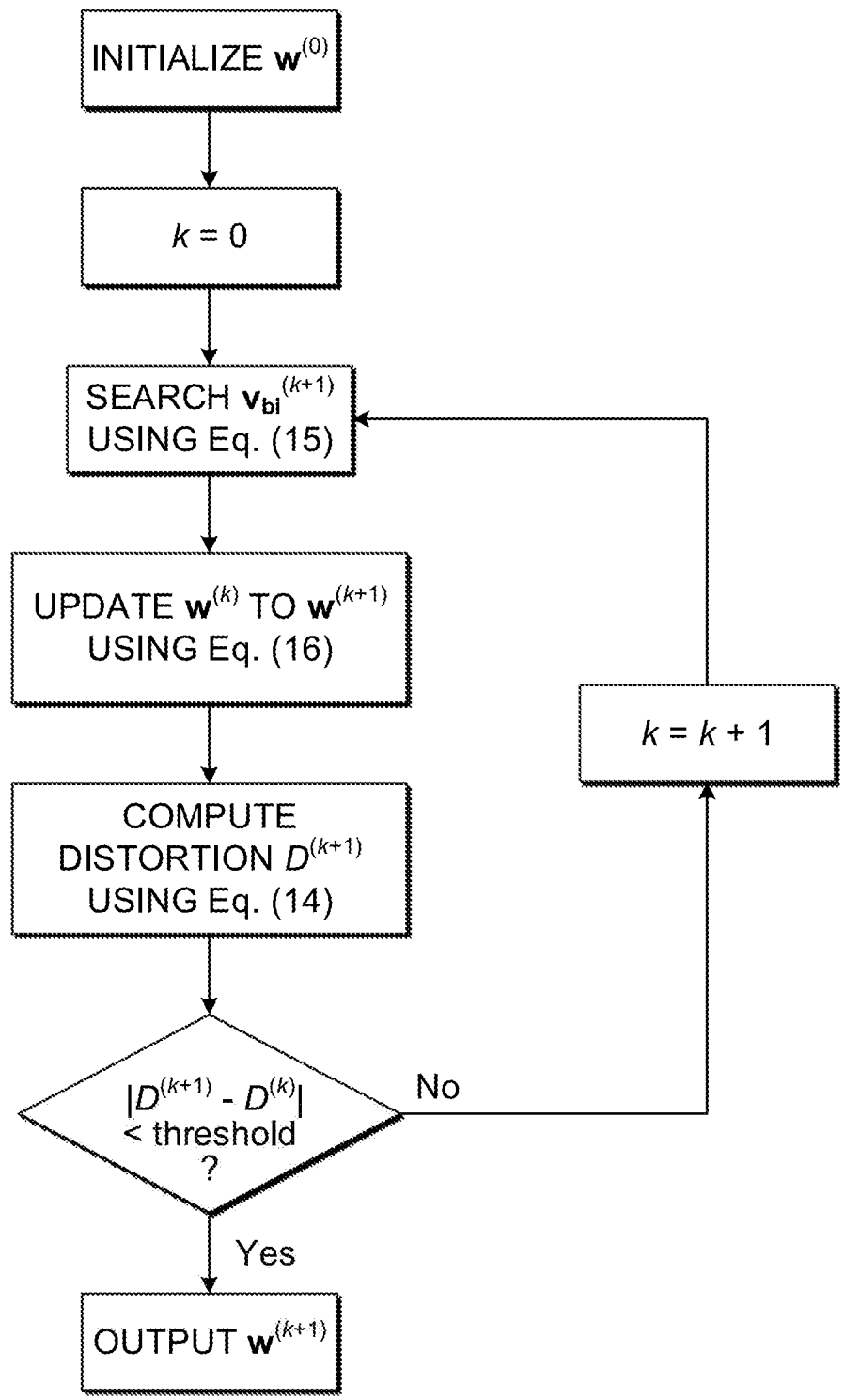
FIG. 10 is a flow diagram illustrating an exemplary iterative training process for filter coefficients.

In cases where the filter is of n-tap, the filtering process for residual prediction signal $\tilde{R}[x]$ may be formulated as follows:

$$\tilde{R}'[x]=\Sigma_{j=1}^{n} w_i * \tilde{R}[x+v_b+o_j] \quad (12)$$

where $w_1$, $j=1, \ldots n$, represents the value of a filter coefficient, $v_b$ is the residual-domain motion vector of a block b at which the sample x is located, and $o_j$ is an offset vector pointing to the position at which the associated filter input for $w_j$ is located relative to $x+v_b$. For example, the ordered offset vectors used for a 9-tap filter are $o_j \in \{(-1,-1), (0,-1), (1,-1), (-1,0), (0,0), (1,0), (-1,1), (0,1), (1,1)\}$, representing a 3×3 neighborhood of sample positions. For simplicity, Eq. (12) may be expressed using a vector form:

$$\tilde{R}'[x]=\tilde{R}^T[x+v_b]*w \quad (13)$$

where $\tilde{R}^T[x+v_b]=[\tilde{R}[x+v_b+o_1], \tilde{R}[x+v_b+o_2], \ldots, \tilde{R}[x+v_b+o_n]]^T$ and $w=[w_1, w_2, \ldots, w_n]^T$. The objective of the filtering process is to minimize the difference between $\tilde{R}'[x]$ and the desired signal $R[x|m]$, that is, un-coded residual signals generated through subtracting intra or inter prediction signal from the source signal. With Eq. (13), this problem can be formulated as $$\text{minimize}_{v_{bi},w} D=\Sigma_{bi \in B}\Sigma_{x \in bi} \|R[x|m_{bi}]-\tilde{R}^T[x+v_{bi}]*w\|_2^2 \quad (14)$$

where B is a set of blocks, bi, that are coded with MCRP in training sequences, $R[x|m_{bi}]$ is un-coded first-order residual generated by either intra or inter prediction according to $m_{bi}$, and D is the sum of residuals' prediction errors. The problem may be approached through an iterative least squares solution. An exemplary method, as illustrated in FIG. 10, involves finding blocks in which MCRP is enabled with the best filter, $w^{(k)}$, at k-th iteration. The resulting blocks, bi, along with $v_b$ are then utilized to improve the estimate $w^{(k)}$ to $w^{(k+1)}$. These steps may be repeated until the change in the value of D between successive iterations falls below a threshold. The following elaborates on each of the steps.

1) Motion Estimation for Residual-Domain MVs.

Consider the k-th iteration, where the current best weight vector is $w^{(k)}$. Using the estimates in Eq. (14), the motion search criterion can be expressed as follows:

$$v_{bi}^{(k+1)}=\text{argmin}_{v_{bi}}\Sigma_{x \in bi}\|R[x|m_{bi}]-\tilde{R}^T[x+v_{bi}]*w^{(k)}\|_2^2+\lambda*\text{Bits}(v_{bi}) \quad (15)$$

Once the encoder determines that MCRP is the best prediction mode, the block b and the associated $v_{bi}$ are collected in $B^{(k+1)}$.

2) Adaptation of Filter Coefficients.

To obtain new estimates of filter coefficients, the resulting $B^{(k+1)}$, $v_{bi}^{(k+1)}$ and $x^{(k+1)}$ may be substituted for B, $v_{bi}$ and x in Eq. (14). The filter coefficients in w may be obtained through the following equation:

$$w^{(k+1)}=\text{argmin}_w \Sigma_{bi \in B^{(k+1)}}\Sigma_{x^{(k+1)} \in bi} \|R[x^{(k+1)}|m_{bi}]-\tilde{R}^T[x^{(k+1)}+v_{bi}^{(k+1)}]*w\|_2^2 \quad (16)$$

To facilitate solving $w^{(k+1)}$ from this linear system Eq. (16) may alternatively be expressed in matrix form as follows:

$$w^{(k+1)} = \text{argmin}_w \left\| \begin{bmatrix} R[x_{1,1}^{(k+1)}|m_{bi}] \\ R[x_{1,2}^{(k+1)}|m_{bi}] \\ \vdots \\ R[x_{1,m}^{(k+1)}|m_{bi}] \\ \hline R[x_{2,1}^{(k+1)}|m_{bi}] \\ R[x_{2,2}^{(k+1)}|m_{bi}] \\ \vdots \\ R[x_{2,m}^{(k+1)}|m_{bi}] \\ \vdots \end{bmatrix} - \begin{bmatrix} \tilde{R}^T[x_{1,1}^{(k+1)}+v_{b1}^{(k+1)}] \\ \tilde{R}^T[x_{1,2}^{(k+1)}+v_{b1}^{(k+1)}] \\ \vdots \\ \tilde{R}^T[x_{1,m}^{(k+1)}+v_{b1}^{(k+1)}] \\ \tilde{R}^T[x_{2,1}^{(k+1)}+v_{b2}^{(k+1)}] \\ \tilde{R}^T[x_{2,2}^{(k+1)}+v_{b2}^{(k+1)}] \\ \vdots \\ \tilde{R}^T[x_{2,m}^{(k+1)}+v_{b2}^{(k+1)}] \\ \vdots \end{bmatrix} *w \right\|_2^2$$

$$= \text{argmin}_w \|y-A^T w\|_2^2, \quad (17)$$

where $x_{i,j}$ denotes $x_{i,j}$'s sample position recorded relative to the top-left corner of a picture and the subscripts i and j indicate that $x_{i,j}$ is the j-th sample of i-th block, bi, collected in $B^{(k+1)}$. As Eq. (17) is a quadratic function, $w^{(k+1)}$ can be solved directly through a closed-form solution; that is, $$w^{(k+1)}=(AA^T)^{-1}Ay \quad (18)$$

Storage of Residual Reference Pictures.

Maintaining the residual reference pictures in full sample bit-depth can be costly. Considering that the number of residual reference pictures can be the same as the number of pixel reference pictures, no matter whether a frame buffer compression technique is applied, the overall memory size for storage is expected to roughly double. What is more severe in storage is that, without any processing, the residual signal consumes 1 additional bit to keep its sign value, so the overall storage size for both residual and pixel reference frames is more than twice as much as that for pixel reference frames.

To save storage size, the sign value of $\tilde{R}[x]$ may be trimmed, only its absolute value may be unchanged. This approach effectively limits the extra storage size to be exactly the same as that for pixels' reference pictures, and at the same time, this does not affect the residual prediction performance as the proposed residual prediction, shown in Eq. (3), does not need to know the sign value of $\tilde{R}[x]$ at each sample position x.

To further limit the storage size, the least significant bits of residual reference pictures are rounded and truncated before residual reference frames are stored in the residual reference picture store (shown in FIG. 5 and FIG. 7). This process can be expressed by the following equation:

$$\tilde{R}[x]=\lfloor(\tilde{R}'[x]+2^{n-1})>>n\rfloor \quad (19)$$

where n is a non-negative integer. It is noted that if Eq. (11) is taken to be the de-noising method, the dynamic range of the parameter n in Eq. (19) should be larger than or equal to the value of the n used in Eq. (11), because this truncation process is done after the de-noising process is applied (as specified in the section "De-noising filtering for residual reference pictures"). Zeros are padded for reconstruction. In view of Eq. (19), Eq. (3) for a composite prediction may be expressed in a more precise form as $$P[x|m,v] = \tilde{P}[x|m] + S[x] * (|\tilde{R}[x+v]| << n) \quad (20)$$

Signaling of Motion-Compensated Residual Prediction

This section describes an exemplary syntax design of MCRP, including mode flags and residuals' motion information.
MCRP Mode Related Syntax Elements.

In exemplary embodiments, a mode flag residual_prediction_flag for indicating the use of MCRP may be signaled in the bitstream at the block level (e.g. either the CU or PU level), depending on the control of the flag, residual_prediction_at_cu_flag, sent at the slice, picture, or sequence level. These two flags may be used to prevent the MCRP mode from signaling residuals' MVs for each CU and PU because in some cases there is not much residual signal left after inter and intra prediction is performed, and thus MCRP need not always be enabled.

Due to the variety of video characteristics, first-order prediction may already perform well by using some (or all) of inter prediction, merge modes and intra prediction at particular block levels. In some embodiments, for a finer control in addition to residual_prediction_at_cu_flag, three additional flags are introduced at the slice, picture or sequence level, allowing MCRP to be enabled in combination with different coding modes: inter prediction (controlled by residual_prediction_with_inter_flag), merge modes (by residual_prediction_with_merge_flag) and intra prediction (by residual_prediction_with_intra_flag). The exemplary residual_prediction_flag flag is signaled for inter prediction PU, merge PU and intra prediction PU only when these respective high-level flags are enabled. To have a higher adaptation regarding block sizes, the residual_prediction_flag flag may be signaled only for some CU sizes. To do so, two indicators may be used, residual_prediction_with_inter_min_level and residual_prediction_with_intra_min_level, signaled at the slice, picture or sequence level to indicate the minimum CU size that MCRP can be applied to inter and intra prediction residuals, respectively. Limiting the signaling of residual_prediction_flag for small CUs may help reduce the signaling overhead.

In exemplary embodiments, an additional flag, residual_zero_cbf_flag, may be signaled at the slice, picture, or sequence level, for indicating whether the residual signal (that is, the second-order residual signal) generated after MCRP needs signaling. If both this flag and residual_prediction_flag are enabled, the coded block flags (cbf) of each CU are inferred as zero and need not be signaled. This flag residual_zero_cbf_flag works particularly well when the residual predicted from MCRP is accurate enough. That is, most of the intra and inter prediction residuals can be captured by the residual prediction process, and thus there is no need to further coding the remaining (that is, second-order) residuals.
Motion Information Coding for MCRP.

As the characteristics of motion information for second-order prediction and those for first-order prediction are quite different from each other, embodiments disclosed herein provide an alternative syntax design for the former regarding its motion vector coding and reference picture selection. For convenience, the motion information (e.g. MV, MVD) for second-order prediction and that for first-order prediction are referred hereafter to as residual-domain motion and pixel-domain motion.

Residual-Domain Motion Vector Coding.

To reduce the overhead of signaling residual-domain motion vectors, various coding tools are disclosed herein. Exemplary coding tools include MV resolution, MV field selection for MV prediction, and MVD binarization. For ease of explanation, embodiments are described in which uni-prediction is applied to MCRP, so there is only one residual-domain MV per PU. However, in some embodiments, the systems and methods described herein are used for bi-prediction of residuals.

1) MV 7 Resolution.

In an exemplary embodiment, residual-domain MVs are represented in r-pel precision, where $r \in \{2^d | d$ belongs to integer numbers$\}$. The benefit of using coarser resolution (e.g. $r \geq 1$ or $d \geq 0$) for representing residual-domain MVs is twofold. Firstly, when r is an integer, the interpolation filter used for motion compensation can be bypassed completely. This does not only reduce the complexity of performing MCRP but also prevents MCRP from generating over-smoothed residual prediction signals for predicting intra and inter prediction residuals, that is, high-frequency signals. Secondly, residual-domain MVs are typically larger in magnitude when compared with pixel-domain MVs. This can be observed from FIG. 11, which illustrates the residual-domain (as represented by the bright arrows) and pixel-domain (as represented by the dark arrows) motion fields of FIG. 4B. Because the energy of first-order residuals is distributed mostly on object boundaries, it is highly probable that residual-domain MVs would point to these boundaries rather than a nearby region pointed to by short MVs. Therefore, using a coarser MV resolution helps reduce the signaling overhead of these residual-domain MVs with large magnitudes.

2) MV Field Selection for MV Prediction.

To predict residual-domain MVs, in some embodiments, a choice is available between using either a pixel-domain motion field or a residual-domain motion field as the input to generate the MV prediction list. The former has lower complexity as it reuses all the existing design from inter modes, but it may not be accurate enough due to the different characteristics of residual-domain and pixel-domain MVs. The latter may have higher complexity due to the need to buffer all the residual-domain MVs at each frame but may provide more accurate prediction. Thus, the latter may provide better performance for residual-domain MV prediction.

There is an interaction between MV prediction list and MV resolution in the case where the pixel-domain motion field is used to construct the MV prediction list for residual-domain MVs. Because pixel-domain MVs can be stored in the associated motion field with higher resolution (e.g. $\frac{1}{16}$-pel precision), it is not guaranteed that their MV resolution can be aligned with that of the residual-domain MVs. Before the MV prediction list can be used for computing residual-domain MVD, all its MV predictors may be rounded to the same resolution as that of residual-domain MVs to ensure that both MVD and MV are represented in the same resolution. The rounding operation may be given as follows:

$$v'_c = \lfloor (v_c + 2^{log2(r/2m)}) >> \log 2(r/m) \rfloor \quad (21)$$

where $v_c$ denotes the horizontal and vertical components of a MV, m is the MV resolution (e.g. $m \in \{\frac{1}{4}, \frac{1}{8}\}$) of $v_c$ used for storage, and r is the residual-domain MV resolution defined in the previous section. It is noted that the value of m should be smaller than or equal to r (thus having higher MV resolution).

3) MVD Binarization.

The present disclosure further provides an alternative technique for binarizing the absolute value, $|v_c|$, of each component in residual-domain MV. If the first bit is equal to 0, $|v_c|$ is equal to 0; otherwise (if it is equal to 1), $|v_c|$ is larger than 0. The rest of the events (i.e. $|v_c|\in\{1, 2, 3, \ldots\}$) are represented by using the Exponential-Golomb code with an initialization parameter k, where $k\in\{0, 1, 2, 3, \ldots\}$.

Reference Picture Selection.

To reach an advantageous tradeoff between syntax overhead and coding efficiency, exemplary methods are described that can further reduce the signaling overhead of reference picture syntax, that is, the reference list index and reference picture index. Such methods include removal of the bi-prediction indicator, reference list inference, and reference picture inference. These methods are described in greater detail below. It is noted that these methods can be further combined with each other in different ways. For example, in one such combination, both reference picture list and reference picture index can be inferred without any signaling.

1.) Removal of Bi Prediction Indicator.

When MCRP is a uni-direction residual prediction method, the indicator used for identifying bi- or uni-prediction can be removed. In this method, the syntax elements used for indicating the exact residual reference picture of MCRP may include one flag for the reference list index to identify which of L0 or L1 reference list is used, and one reference picture index signaled in the same way as for inter modes.

2.) Reference List Inference.

A further embodiment operates to save the bits used for the reference list by inferring the list ather than signaling it. Different embodiments may use different methods to derive the reference list for MCRP. In some embodiments, the reference picture list used in MCRP may be inferred to be, e.g. L0 or L1. In a further embodiment, the reference picture list used in MCRP is inferred to be the same reference list as that used in the pixel-domain motion field of the same PU, and L0 is set as the default reference list in case the current PU is not coded with uni-prediction (e.g. bi-prediction and intra prediction). After the reference picture list is inferred, the reference picture index used in MCRP may be signaled in the same way as for inter mode.

3.) Reference Picture Inference.

Some embodiments use a reference picture inference method to save overhead of signaling the reference picture index. Various methods may be used to infer rather than explicitly signal the reference picture index (or RefPicIdx) for MCRP. In a first method, the reference picture index for MCRP may be inferred to be 0 (i.e. RefPicIdx=0), that is, the reference picture used for MCRP is the first picture in either L0 or L1. A second method is the same as the first method, except when the two pictures with RefPicIdx=0 in both reference lists L0 and L1 are identical; in this case, the reference picture index for MCRP is inferred to 0 (i.e. the first picture) if L0 is used, and inferred to be 1 (i.e. the second picture) if L1 is used. In a third method, the reference picture index is inferred directly from the current PU, and in case the current PU has no such information (e.g. it is intra coded), the first picture (i.e. RefPicIdx=0) in the list is used.

After the reference picture index is inferred, the reference picture list used in MCRP may be signaled in the same way as for inter modes, using a flag for reference list index to identify which of L0 or L1 reference list is used.

In addition, it is noted that the proposed inference methods above can be further combined with each other in different ways. For example, in one such combination, both reference picture list and reference picture index can be inferred without any signaling.

Encoder-Only Search Strategies for Residual-Domain MV

Modification in Fast Motion Estimation.

Figure 11:
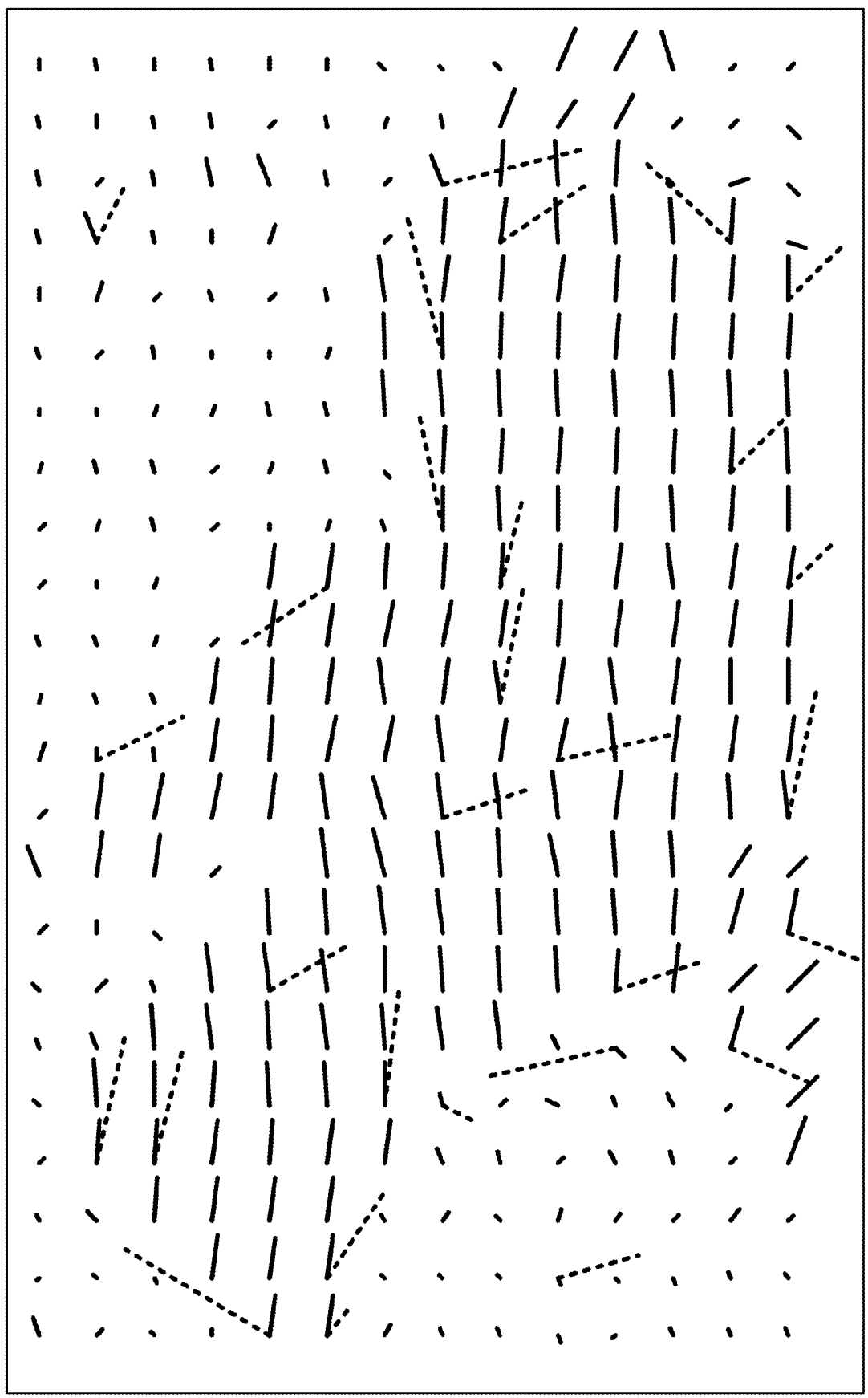
FIG. 11 illustrates an example of pixel-domain MVs (black) and residual-domain MVs (white) plotted for each 16×16 block. When plotting this figure, single reference frame and uni-prediction are employed.

In motion search for MCRP, applying the same early-termination threshold as for pixel-domain motion estimation (ME) to MCRP can worsen the residual prediction performance. This threshold, which defines the maximum coverage of pixel positions that can be tested during the ME stage, is usually off-line trained in favor of pixel-domain prediction. Its value need not be large because the correlation between MVs in pixels' motion field is very high. However, as indicated in FIG. 11, residual-domain motion fields exhibit more randomness and often have larger-magnitude MVs, and thus a small early-termination threshold for residual-domain ME cannot guarantee that an accurate matching block from residual reference pictures can be found. In an exemplary embodiment, an alternative stopping threshold may be used for residual-domain ME. The threshold value may be n times ($n\in\{2, 3, 4,$ or larger$\}$) as large as the one used in pixels' ME. To facilitate understanding how the proposed method works, the diamond search is taken as an example for demonstration. It is noted that to perform diamond search, a parameter d and an initial search position (x,y) may be given for this algorithm to identify a set of testing positions (x',y') that matches this constraint: $|x'-x|+|y'-y|=d$.

In diamond search, ME starts from a given initial search position with an initial parameter d. Then, d is increased gradually for searching more pixel positions within a diamond-shaped contour until the stopping criterion is reached. This criterion may be selected such that ME stops if none of the searched positions during every m (e.g. m=3 in some implementations) consecutive iterations can produce a better prediction result than the current best MV. In other words, if the current best MV is found at a certain d, the search stops if this MV is not replaced after d is further updated for m times. When diamond search is applied to residual ME, the early-termination threshold m is replaced by m*n. When the MV resolution, r, of residual-domain MV is set larger than 1, the early-termination threshold becomes m*n*r.

Joint Optimization with Inter, Intra and Merge Modes.

Exemplary MCRP techniques described herein may be combined with other prediction modes. As this is a joint optimization problem, with Eq. (20), this problem can be formulated as finding the residual-domain MV, $v_b$, for MCRP and the parameters $m_b$ for intra or inter prediction for minimizing the ME-stage cost; that is:

$$\text{Cost}(m_b, v_b) = \Sigma_{x\in b}|I[x]-P[x|m_b,v_b]|+\lambda*\text{Bits}(m_b, v_b) \quad (22)$$

Where $P[x|m_b,v_b]$ is as defined earlier in Eq. (20), I[x] is the original video signal, $m_b$ may contain, but is not limited to, one of the following types of information, depending on which prediction mode is used in combination with MCRP: motion information (e.g. motion vectors, reference list indices and reference frame indices to be signaled) for normal inter prediction; merge index for merge prediction; and intra direction mode for intra prediction.

It is noted that the specific metric (sum of absolute distortion) used in Eq. (22) and the following Eqs. (23) and (24) for measuring distortion is simply an example. It can be replaced by other metrics, such as sum of absolute square distortion, sum of absolute transform distortion, or sum of absolute reconstruction distortion. The third metric, sum of absolute reconstruction distortion, has the highest performance but is also the most complex, since the current block is coded and reconstructed for every pair of $m_b$ and $v_b$ that are visited before the sum of square error of $I[x]-\hat{I}[x]$ over all x in a block b can be computed in place of $I[x]-P[x|m_b, v_b]$.

Figure 12:
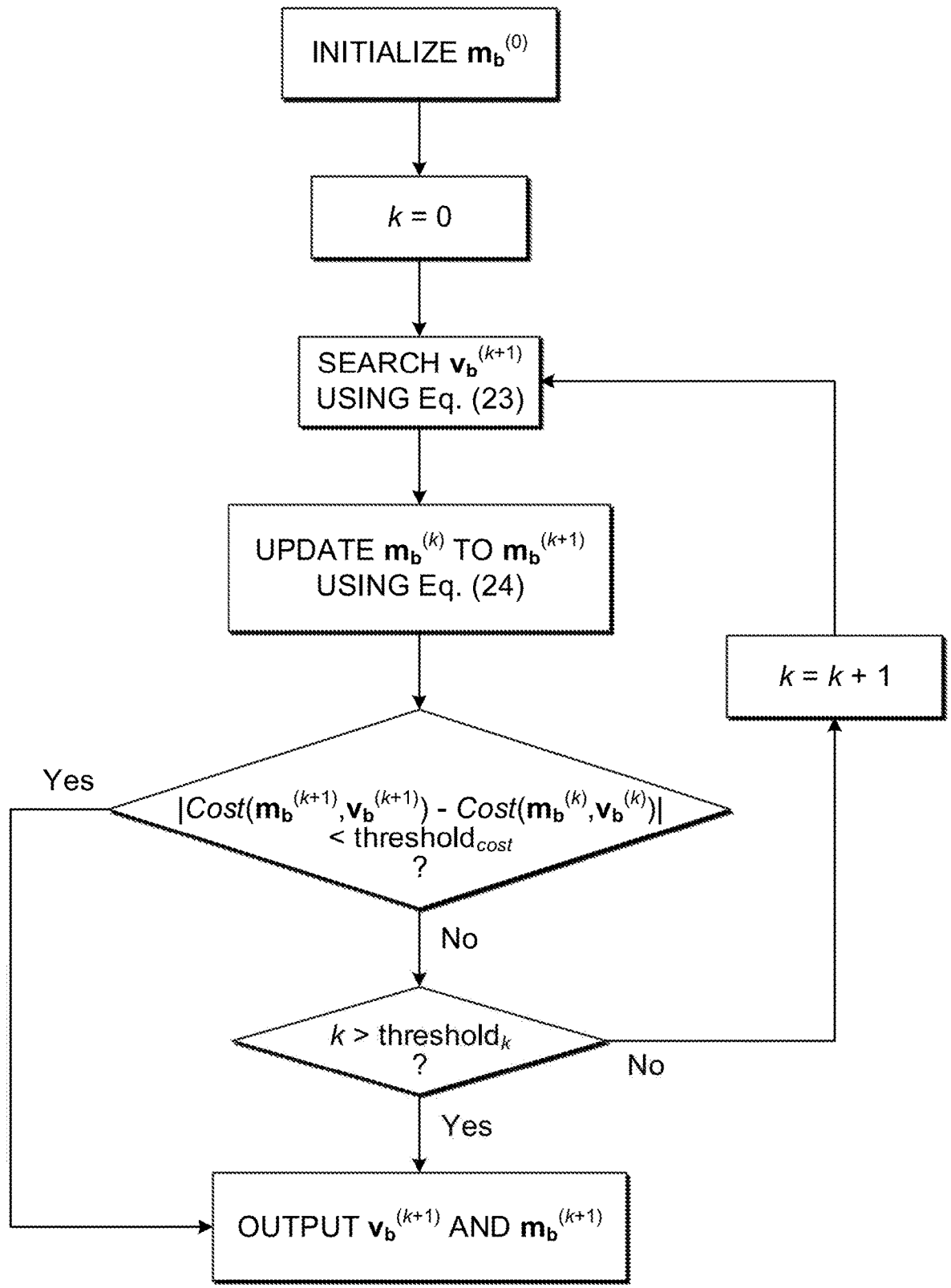
FIG. 12 is a flow chart illustrating an exemplary joint-optimization process for MCRP and other prediction modes.

Since there are two parameters (i.e. $m_b$ and $v_b$) to be determined in Eq. (22), this problem can be solved through an iterative search process as given in FIG. 12. The procedure involves finding the best $v_b$ with the currently best $m_b$ at k-th iteration. The resulting $v_b$ are then utilized to further improve the parameters in $m_b^{(k)}$ to $m_b^{(k+1)}$. These two steps will repeat until the change in the ME-stage cost (Cost($m_b$, $v_b$)) between successive iterations falls below a threshold or until the number, k, of iterations is greater than a given threshold. To begin, the initial parameter $m_b^{(0)}$ is defined as the parameter set of a certain prediction mode that MCRP is jointly optimized with. The following elaborates on each of the steps.

1) Motion Estimation for Residual-Domain MVs.

Consider the k-th iteration, in which the current best parameter set is $m_b^{(k)}$. With Eq. (22), the motion search criterion for residual-domain MV may be defined as follows:

$$v_b^{(k+1)} = \operatorname{argmin}_{v_b} \sum_{x \in b} |I[x] - P[x|m_b^{(k)}, v_b]| + \lambda * \operatorname{Bits}(m_b^{(k)}, v_b) \quad (23)$$

$$= \operatorname{argmin}_{v_b} \sum_{x \in b} \left|(I[x] - \tilde{P}[x|m_b^{(k)}]) - S[x] * |\tilde{R}[x + v_b]|\right| +$$

$$\lambda * \operatorname{Bits}(v_b).$$

From Eq. (23), the optimization problem is to find a $v_b$ that can minimize the difference between residual prediction signal and $I[x]-\tilde{P}[x|m_b^{(k)}]$. The bit overhead of $m_b^{(k)}$ need not be considered because its parameters are deterministic in this iteration and is irrelevant to the searching result of $v_b^{(k+1)}$. As this optimization process is the same as that for uni-prediction, $v_b$ can be found by using the same search process as for uni-prediction except that the desired signal becomes $I[x]-\tilde{P}[x|m_b^{(k)}]$, the reference pictures are from residual reference picture store, and the syntax design follows those specified in the sections "Motion information coding for MCRP" and "Modification in fast motion estimation."

2) Update for Parameter Set.

With a given residual-domain MV, $v_b^{(k+1)}$, the parameters in $m_b$ can be further updated through the following equation:

$$m_b^{(k+1)} = \operatorname{argmin}_{m_b} \sum_{x \in b} |I[x] - P[x|m_b, v_b^{(k+1)}]| + \lambda * \operatorname{Bits}(m_b, v_b^{(k+1)}) \quad (24)$$

$$= \operatorname{argmin}_{m_b} \sum_{x \in b} \left|(I[x] - S[x] * |\tilde{R}[x + v_b^{(k+1)}]|) - \tilde{P}[x|m_b]\right| +$$

$$\lambda * \operatorname{Bits}(m_b).$$

As can be seen, the optimization process of $m_b^{(k+1)}$ can be independent of $v_b^{(k+1)}$ if the desired signal $I[x]$ is replaced by $I[x]-S[x]*|I[x][x+v_b^{(k+1)}]|$ and the bit overhead of $v_b^{(k+1)}$ can be neglected. The latter does not affect the result of $m_b^{(k+1)}$ as $v_b^{(k+1)}$ is already a deterministic vector in this iteration. Therefore, the optimization process of finding $m_b^{(0)}$ can be completely reused with the aforementioned changes.

Exemplary Bitstream Communication Framework

Figure 13:
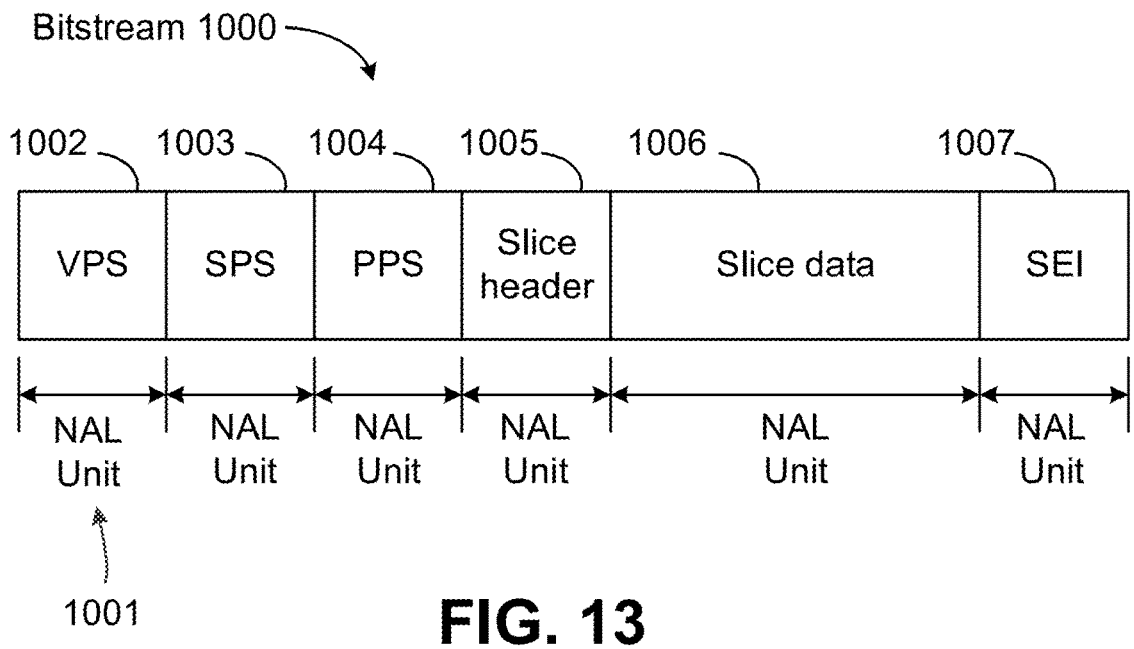
FIG. 13 is a diagram illustrating an example of a coded bitstream structure.

FIG. 13 is a schematic diagram illustrating an example of a coded bitstream structure. A coded bitstream 1000 consists of a number of NAL (Network Abstraction layer) units 1001. A NAL unit may contain coded sample data such as coded slice 1006, or high level syntax metadata such as parameter set data, slice header data 1005 or supplemental enhancement information data 1007 (which may be referred to as an SEI message). Parameter sets are high level syntax structures containing essential syntax elements that may apply to multiple bitstream layers (e.g. video parameter set 1002 (VPS)), or may apply to a coded video sequence within one layer (e.g. sequence parameter set 1003 (SPS)), or may apply to a number of coded pictures within one coded video sequence (e.g. picture parameter set 1004 (PPS)). The parameter sets can be either sent together with the coded pictures of the video bit stream, or sent through other means (including out-of-band transmission using reliable channels, hard coding, etc.). Slice header 1005 is also a high level syntax structure that may contain some picture-related information that is relatively small or relevant only for certain slice or picture types. SEI messages 1007 carry the information that may not be needed by the decoding process but can be used for various other purposes such as picture output timing or display as well as loss detection and concealment.

Figure 14:
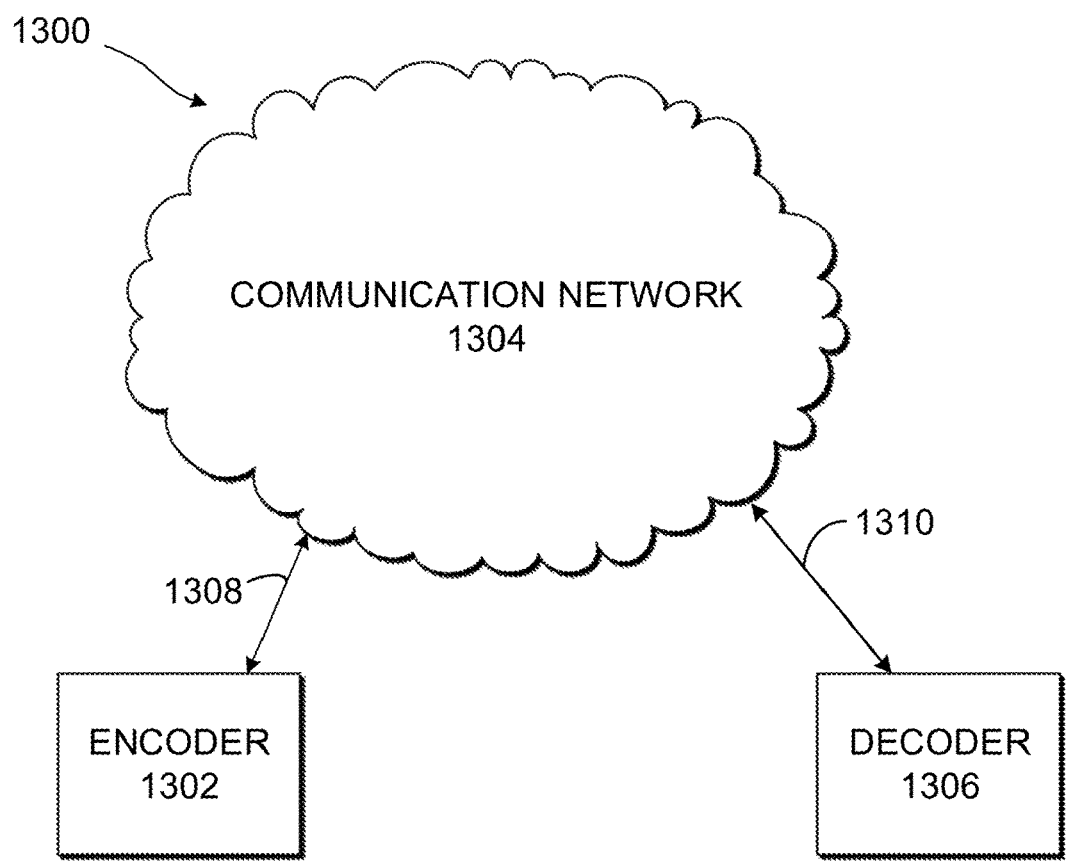
FIG. 14 is a diagram illustrating an example communication system.

FIG. 14 is a schematic diagram illustrating an example of a communication system. The communication system 1300 may comprise an encoder 1302, a communication network 1304, and a decoder 1306. The encoder 1302 may be in communication with the network 1304 via a connection 1308, which may be a wireline connection or a wireless connection. The encoder 1302 may be similar to the block-based video encoder of FIG. 1. The encoder 1302 may include a single layer codec (e.g., FIG. 1) or a multilayer codec. For example, the encoder 1302 may be a multi-layer (e.g., two-layer) scalable coding system with picture-level ILP support. The decoder 1306 may be in communication with the network 1304 via a connection 1310, which may be a wireline connection or a wireless connection. The decoder 1306 may be similar to the block-based video decoder of FIG. 2. The decoder 1306 may include a single layer codec (e.g., FIG. 2) or a multilayer codec. For example, the decoder 1306 may be a multi-layer (e.g., two-layer) scalable decoding system with picture-level ILP support.

The encoder 1302 and/or the decoder 1306 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1304 may be a suitable type of communication network. For example, the communications network 1304 may be a multiple access system that provides content, such as voice, data, video, messaging, broadcast, etc., to multiple wireless users. The communications network 1304 may enable multiple wireless users to access such content through the sharing of system resources, including wireless bandwidth. For example, the communications network 1304 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1304 may include multiple connected communication networks. The communication network 1304 may include the Internet and/or one or more private commercial networks such as cellular networks, WiFi hotspots, Internet Service Provider (ISP) networks, and/or the like.

Figure 15:
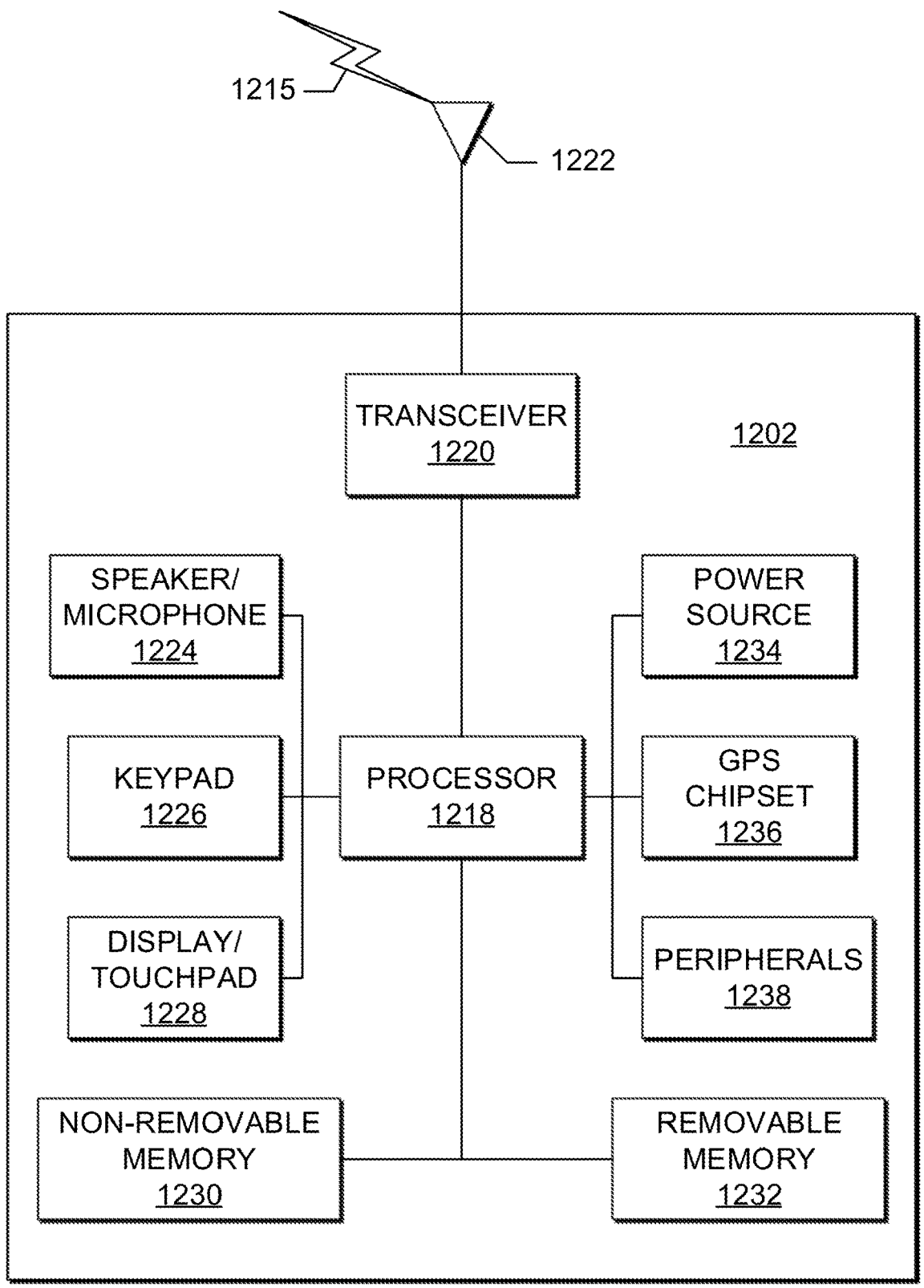
FIG. 15 is a diagram illustrating an example wireless transmit/receive unit (WTRU), which may be used as an encoder or decoder in some embodiments.

FIG. 15 is a system diagram of an example WTRU in which an encoder or decoder as described herein may be implemented. As shown the example WTRU 1202 may include a processor 1218, a transceiver 1220, a transmit/receive element 1222, a speaker/microphone 1224, a keypad or keyboard 1226, a display/touchpad 1228, non-removable memory 1230, removable memory 1232, a power source 1234, a global positioning system (GPS) chipset 1236, and/or other peripherals 1238. It will be appreciated that the WTRU 1202 may include any sub-combination of the foregoing elements while remaining consistent with an embodiment. Further, a terminal in which an encoder (e.g., encoder 100) and/or a decoder (e.g., decoder 200) is incorporated may include some or all of the elements depicted in and described herein with reference to the WTRU 1202 of FIG. 15.

The processor 1218 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the WTRU 1500 to operate in a wired and/or wireless environment. The processor 1218 may be coupled to the transceiver 1220, which may be coupled to the transmit/receive element 1222. While FIG. 15 depicts the processor 1218 and the transceiver 1220 as separate components, it will be appreciated that the processor 1218 and the transceiver 1220 may be integrated together in an electronic package and/or chip.

The transmit/receive element 1222 may be configured to transmit signals to, and/or receive signals from, another terminal over an air interface 1215. For example, in one or more embodiments, the transmit/receive element 1222 may be an antenna configured to transmit and/or receive RF signals. In one or more embodiments, the transmit/receive element 1222 may be an emitter/detector configured to transmit and/or receive IR, UV, or visible light signals, for example. In one or more embodiments, the transmit/receive element 1222 may be configured to transmit and/or receive both RF and light signals. It will be appreciated that the transmit/receive element 1222 may be configured to transmit and/or receive any combination of wireless signals.

In addition, although the transmit/receive element 1222 is depicted in FIG. 15 as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1215.

The transceiver 1220 may be configured to modulate the signals that are to be transmitted by the transmit/receive element 1222 and/or to demodulate the signals that are received by the transmit/receive element 1222. As noted above, the WTRU 1202 may have multi-mode capabilities. Thus, the transceiver 1220 may include multiple transceivers for enabling the WTRU 1500 to communicate via multiple RATs, such as UTRA and IEEE 802.11, for example.

The processor 1218 of the WTRU 1202 may be coupled to, and may receive user input data from, the speaker/microphone 1224, the keypad 1226, and/or the display/touchpad 1228 (e.g., a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In one or more embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1218 may be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1215 from a terminal (e.g., a base station) and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include an accelerometer, orientation sensors, motion sensors, a proximity sensor, an e-compass, a satellite transceiver, a digital camera and/or video recorder (e.g., for photographs and/or video), a universal serial bus (USB) port, a vibration device, a television transceiver, a hands free headset, a Bluetooth® module, a frequency modulated (FM) radio unit, and software modules such as a digital music player, a media player, a video game player module, an Internet browser, and the like.

By way of example, the WTRU 1202 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet computer, a personal computer, a wireless sensor, consumer electronics, or any other terminal capable of receiving and processing compressed video communications.

The WTRU 1202 and/or a communication network (e.g., communication network 804) may implement a radio technology such as Universal Mobile Telecommunications System (UMTS) Terrestrial Radio Access (UTRA), which may establish the air interface 1215 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The WTRU 1202 and/or a communication network (e.g., communication network 804) may implement a radio technology such as Evolved UMTS Terrestrial Radio Access (E-UTRA), which may establish the air interface 1215 using Long Term Evolution (LTE) and/or LTE-Advanced (LTE-A).

The WTRU 1202 and/or a communication network (e.g., communication network 804) may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. The WTRU 1500 and/or a communication network (e.g., communication network 804) may implement a radio technology such as IEEE 802.11, IEEE 802.15, or the like.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
   generating a residual reference picture comprising at least one block, the residual reference picture representing a difference between a corresponding block of a reference picture and a corresponding first-order prediction of the reference picture;
   filtering the residual reference picture with a de-noising filter to generate a filtered residual reference picture; and
   for at least a current block in a current picture:
      forming a first-order prediction of the current block;
      predicting residuals of the current block from a residual reference block in the filtered residual reference picture using motion-compensated prediction; and
      combining the first-order prediction and the predicted residuals to generate a composite prediction signal for the current block.

2. The method of claim 1, wherein a flag is signaled in a bitstream at the block level indicating whether to predict residuals of the current block from the filtered residual reference picture.

3. The method of claim 1, wherein generating the first-order prediction comprises predicting the current block using intra prediction.

4. The method of claim 1, wherein generating the first-order prediction comprises predicting the current block using inter prediction.

5. The method of claim 1, wherein filtering the residual reference picture comprises taking an absolute value of at least some of the samples in the residual reference picture.

6. The method of claim 5, wherein a sign value is signaled in a bitstream for the current block, and wherein predicting residuals of the current block comprises multiplying the residual reference block by the sign value.

7. The method of claim 5, wherein a weighting factor is signaled in a bitstream for the current block, and wherein predicting residuals of the current block comprises multiplying the residual reference block by the weighting factor.

8. The method of claim 1, wherein generating the residual reference picture comprises subtracting a first-order prediction of the reference picture from either a filtered or an unfiltered reconstruction signal of the reference picture, and wherein an indication of whether to use the filtered or the unfiltered reconstruction signal is signaled in a bitstream.

9. The method of claim 1, wherein filtering the residual reference picture comprises applying a threshold to the residual reference picture such that residual values below the threshold in the residual reference picture are zero in the filtered residual reference picture.

10. The method of claim 9, wherein the threshold is selected adaptively to substantially achieve a predetermined ratio k, where k is the ratio of the number of samples below the threshold to the number of samples above the threshold in the current picture.

11. The method of claim 1, wherein filtering the residual reference picture comprises quantizing sample values in the residual reference picture.

12. The method of claim 1, wherein filtering the residual reference picture comprises applying a linear filter to the residual reference picture, wherein coefficients of the linear filter are signaled in a bitstream.

13. The method of claim 1, wherein a residual motion vector is signaled in a bitstream, and wherein predicting residuals includes identifying the residual reference block using the residual motion vector.

14. The method claim 1, further comprising:
determining a second-order residual representing a difference between (i) an input video block corresponding to the current block and (ii) the composite prediction signal for the current block; and
encoding the second-order residual in a bitstream.

15. The method claim 1, further comprising:
receiving, in a bitstream, a second-order residual for the current block; and
reconstructing the current block by adding the second-order residual to the composite prediction signal for the current block.

16. A system comprising:
a processor configured to perform at least:
generating a residual reference picture comprising at least one block, the residual reference picture representing a difference between a corresponding block of a reference picture and a first-order prediction of the reference picture;
filtering the residual reference picture with a de-noising filter to generate a filtered residual reference picture; and
for at least a current block in a current picture:
forming a first-order prediction of the current block;
predicting residuals of the current block from a residual reference block in the filtered residual reference picture using motion-compensated prediction; and
combining the first-order prediction and the predicted residuals to generate a composite prediction signal for the current block.

17. The system of claim 16, wherein the processor is further configured to perform functions comprising:
determining a second-order residual representing a difference between (i) an input video block corresponding to the current block and (ii) the composite prediction signal for the current block; and
encoding the second-order residual in a bitstream.

18. The system of claim 16, wherein the processor is further configured to perform functions comprising:
receiving, in a bitstream, a second-order residual for the current block; and
reconstructing the current block by adding the second-order residual to the composite prediction signal for the current block.

19. A video decoder for decoding a video from a bitstream, wherein the video comprises a plurality of pictures, including a current picture and at least one reference picture, each picture comprising blocks of samples, the video decoder being operative to perform functions comprising:
generating a residual reference picture comprising at least one block, the residual reference picture representing a difference between a corresponding block of the reference picture and a first-order prediction of the reference picture;
filtering the residual reference picture with a de-noising filter to generate a filtered residual reference picture; and
for at least a current block in the current picture:
forming a first-order prediction of the current block;
predicting residuals of the current block from a residual reference block in the filtered residual reference picture using motion-compensated prediction; and
combining the first-order prediction and the predicted residuals to generate a composite prediction signal for the current block.

20. The video decoder of claim 19, wherein the decoder is further configured to perform functions comprising:
receiving, in a bitstream, a second-order residual for the current block; and
reconstructing the current block by adding the second-order residual to the composite prediction signal for the current block.

* * * * *